US009219862B2

(12) United States Patent
Yoshino et al.

(10) Patent No.: US 9,219,862 B2
(45) Date of Patent: Dec. 22, 2015

(54) IMAGING DEVICE

(71) Applicant: PANASONIC CORPORATION, Osaka (JP)

(72) Inventors: Hideyuki Yoshino, Kanagawa (JP); Takashi Ishihara, Kanagawa (JP); Mitsuru Satou, Kanagawa (JP); Yasuyuki Hirouchi, Miyagi (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/236,106

(22) PCT Filed: May 22, 2013

(86) PCT No.: PCT/JP2013/003259
§ 371 (c)(1),
(2) Date: Jan. 30, 2014

(87) PCT Pub. No.: WO2013/175787
PCT Pub. Date: Nov. 28, 2013

(65) Prior Publication Data
US 2014/0168470 A1    Jun. 19, 2014

(30) Foreign Application Priority Data

May 24, 2012  (JP) ................................ 2012-118921
Jul. 3, 2012   (JP) ................................ 2012-149601

(51) Int. Cl.
*H04N 5/232*     (2006.01)
*G06F 3/0488*    (2013.01)
(Continued)

(52) U.S. Cl.
CPC ............ *H04N 5/23248* (2013.01); *G03B 17/18* (2013.01); *G03B 17/38* (2013.01);
(Continued)

(58) Field of Classification Search
CPC .............. H04N 5/232; H04N 5/23216; H04N 5/23248; H04N 5/23112; H04N 5/23293
USPC ........................................ 348/333.04, 333.02
See application file for complete search history.

(56) References Cited

U.S. PATENT DOCUMENTS

2008/0129854 A1    6/2008  Onoda et al.
2009/0094546 A1*   4/2009  Anzelde et al. ................ 715/772
(Continued)

FOREIGN PATENT DOCUMENTS

JP     2008-227820    9/2008
JP     2010-113441    5/2010
(Continued)

OTHER PUBLICATIONS

U.S. Appl. No. 14/164,497 to Takeshi Yamaguchi et al., filed Jan. 27, 2014.
(Continued)

*Primary Examiner* — Nicholas Giles
*Assistant Examiner* — Abdelaaziz Tissire
(74) *Attorney, Agent, or Firm* — Greenblum & Bernstein, P.L.C.

(57) ABSTRACT

An imaging device includes: an imaging portion; a memory capable of storing images imaged by the imaging portion; a display portion; and a touch panel arranged to overlap with the display portion and capable of detecting a distance to an indicator. When the distance is equal to or less than a first distance and more than a second distance less than the first distance, the memory stores the images at predetermined time intervals. Then, when the distance becomes equal to or less than the second distance and equal to or more than 0, the display portion displays the image that is stored in the memory before the distance becomes equal to or less than the second distance and equal to or more than 0.

14 Claims, 17 Drawing Sheets

(51) Int. Cl.
*G03B 17/38* (2006.01)
*G03B 17/18* (2006.01)

(52) U.S. Cl.
CPC ......... *G06F 3/0488* (2013.01); *H04N 5/23216* (2013.01); *G06F 2203/04101* (2013.01); *H04N 5/23212* (2013.01); *H04N 5/23293* (2013.01)

(56) References Cited

U.S. PATENT DOCUMENTS

| | | | |
|---|---|---|---|
| 2009/0174782 A1* | 7/2009 | Kahn et al. .................. | 348/208.2 |
| 2010/0062811 A1* | 3/2010 | Park et al. ...................... | 455/566 |
| 2010/0066810 A1* | 3/2010 | Ryu et al. .......................... | 348/36 |
| 2010/0095206 A1* | 4/2010 | Kim .............................. | 715/702 |
| 2010/0107099 A1* | 4/2010 | Frazier et al. ................. | 715/765 |
| 2010/0309335 A1* | 12/2010 | Brunner et al. ............ | 348/231.6 |
| 2011/0187913 A1* | 8/2011 | Takahashi ................ | 348/333.02 |
| 2011/0193996 A1 | 8/2011 | Onoda et al. | |
| 2011/0291945 A1* | 12/2011 | Ewing et al. .................. | 345/173 |
| 2011/0310261 A1* | 12/2011 | Crisan et al. ............... | 348/207.1 |
| 2012/0084691 A1* | 4/2012 | Yun ................................ | 715/769 |
| 2012/0113056 A1* | 5/2012 | Koizumi ........................ | 345/175 |
| 2013/0169848 A1* | 7/2013 | Shiozaki .................. | 348/333.01 |
| 2014/0293086 A1* | 10/2014 | Ugawa ....................... | 348/222.1 |

FOREIGN PATENT DOCUMENTS

| | | |
|---|---|---|
| JP | 2012-037902 | 2/2012 |
| JP | 2012-104994 | 5/2012 |
| WO | 2013/089190 | 6/2013 |

OTHER PUBLICATIONS

U.S. Appl. No. 14/235,153 to Mitsuru Satou, filed Jan. 27, 2014.
U.S. Appl. No. 14/234,491 to Hidekazu Kano et al., filed Jan. 23, 2014.
U.S. Appl. No. 14/235,878 to Mitsuru Satou, filed Jan. 29, 2014.
International Search Report in PCT/JP2013/003259, mailed on Aug. 20, 2013.

* cited by examiner (a)

(b)

(a)

(b)

(a)

(b)

(a)

(b)

IMAGING DEVICE

TECHNICAL FIELD

The present invention relates to an imaging device suitable for use in portable information terminals, such as a mobile phone, a smartphone, and a tablet, each of which is equipped with a touch panel.

BACKGROUND ART

In recent years, the above portable information terminals each equipped with a touch panel have become widespread. Some portable information terminals of this type are each equipped with an imaging device (i.e., a camera). Shutter systems adopted by the imaging devices include mechanical ones and electrical ones. The electrical shutter systems include one type configured to release a shutter by displaying a shutter-icon on a display screen and depressing (or touching) the shutter-icon, and another type configured to release the shutter by touching a part of an object displayed on a display screen. On the other hand, one of the shutter systems of the mechanical type is configured to release the shutter by depressing a mechanical shutter button.

When image-capturing is performed by a portable information terminal equipped with an imaging device, camera shake may occur due to vibration and inclination of a casing at depression of a shutter. Particularly, portable information terminals are manufactured compact and light from view point of portability. Accordingly, camera shake may occur even only by touching a touch panel. Camera shake occurs in any of the above three types of shutter systems.

One example of reducing camera shake at release of a shutter is described in PTL 1. Camera equipment described in PTL 1 is adapted to generate a signal for capturing a captured image into a recording medium in a state of half-pushing a shutter.

PRIOR ART DOCUMENT

Patent Literature

PTL 1: JP-A-2012-037902

SUMMARY OF THE INVENTION

Problems that the Invention is to Solve

Meanwhile, touch panels include an electrostatic-capacitance touch panel enabling an operation (hereinafter referred to as a "hovering operation") to be performed at a predetermined range of height without touching a panel surface with a finger. Using such a type of a touch panel enables release of a shutter without touching a panel surface. However, this makes it difficult to know at what position in the air the shutter is located. There is a risk of involuntarily releasing the shutter. Thus, even when an electrostatic-capacitance touch panel is used, it is necessary to make contact with (i.e., touch) the touch panel when releasing the shutter. Naturally, camera shake is caused by touching the touch panel.

The invention is accomplished in view of such circumstances and aims at providing an imaging device equipped with an electrostatic-capacitance touch panel, which can capture a camera-shake-free image.

Means for Solving the Problems

An imaging device according to the invention includes an imaging portion, a memory capable of storing images imaged by the imaging portion, a display portion, and a touch panel arranged to overlap with the display portion and capable of detecting a distance to an indicator. When the distance is equal to or less than a first distance and more than a second distance less than the first distance, the memory stores the images at predetermined time intervals. Then, when the distance becomes equal to or less than the second distance and equal to or more than 0, the display portion displays the image that is stored in the memory before the distance becomes equal to or less than the second distance and equal to or more than 0.

According to the above configuration, when the distance between the indicator and the touch panel is larger than the second distance and equal to or less than the first distance, images imaged by the imaging portion are stored in the memory at the predetermined time intervals. Then, when the distance becomes equal to or less than the second distance and equal to or more than 0, an image, which is stored in the memory before the distance becomes such a value, is read from the memory and displayed in the display portion. Thus, a camera-shake-free image can be captured.

According to the above configuration, when the distance is equal to or less than the second distance and equal to or more than 0, the memory stops storing the images at the predetermined time intervals.

According to the above configuration, when the distance between the indicator and the touch panel becomes equal to or less than the second distance and equal to or more than 0, storing a new image is not performed. Thus, an image in which camera shake occurs is not captured.

In the above configuration, the memory is set as a first memory. The apparatus can be equipped with a second memory. When the distance is equal to or less than the second distance and equal to or more than 0, an image, which is stored in the first memory before the distance is equal to or less than the second distance and equal to or more than 0, can be stored in the second memory.

According to the above configuration, when the distance between the indicator and the touch panel is equal to or less than the second distance and equal to or more than 0, an image, the image, which is stored in the first memory before the distance becomes such a value, is stored in the second memory. Then, the only camera-shake-free image can be captured.

In the above configuration, the second distance is 0.

According to the above configuration, the second distance is set to be 0, so that when the indicator touches the touch panel, no new image is stored from then on and an image stored in the memory before the indicator touches the touch panel is displayed.

In the above configuration, the indicator is a finger or a pen.

In the above configuration, when the distance is at least equal to or less than the first distance and larger than the second distance being smaller than the first distance, the display portion displays an image imaged by the imaging portion.

According to the above configuration, the distance between the indicator and the touch panel is equal to or less than the first distance and larger than the second distance, an image imaged by the imaging portion is displayed. Thus, an image (i.e., a preview image), which is present before captured, can be checked.

In the above configuration, the display portion displays a predetermined icon.

According to the above configuration, the predetermined icon is used as a shutter-icon. Thus, the shutter can be released by touching the shutter-icon.

An imaging method according to the invention is an imaging method that can be utilized in an imaging device which includes an imaging portion, a memory capable of storing images imaged by the imaging portion, a display portion, and a touch panel arranged to overlap with the display portion and capable of detecting a distance to an indicator. The imaging method includes a step of making the memory store the images at predetermined time intervals when the distance is equal to or less than the first distance and larger than a second distance which is less than the first distance, and a step of making, when the distance becomes equal to or less than the second distance and equal to or more than 0, the display portion display the image which is stored in the memory before the distance becomes equal to or less than the second distance and equal to or more than 0.

According to the above method, when the distance between the indicator and the touch panel is larger than the second distance and equal to or less than the first distance, images imaged in the imaging portion are stored in the memory at predetermined time intervals. Then, when the distance becomes equal to or less than the second distance and equal to or more than 0, the image stored in the memory before the distance becomes such a value is read from the memory and displayed in the display portion. Thus, a camera-shake-free image can be captured.

An imaging device according to the invention includes an imaging portion, a display portion, and a touch panel arranged to overlap with the display portion and capable of detecting a distance to an indicator. When the distance is equal to or less than the first distance and larger than a second distance which is less than the first distance, execution of a predetermined function is started. Then, when the distance becomes equal to or less than the second distance and equal to or more than 0, the display portion displays the image imaged by the imaging portion.

According to the above configuration, when the distance between the touch panel and the indicator is equal to or less than the first distance and larger than the second distance being smaller than the first distance, a predetermined function is executed. Then, when the distance between the touch panel and the indicator becomes equal to or less than the second distance and equal to or more than 0, the imaged image is displayed.

Incidentally, assuming that, e.g., a focus-adjustment function is employed as the predetermined function, and that a finger is used as the indicator, the focus-adjustment is performed in a case where the distance between the touch panel and the finger is equal to or less than the first distance and larger than the second distance being less than the first distance. Then, when the distance between the touch panel and the finger becomes equal to or less than the second distance and equal to or more than 0, the imaged image is displayed. Accordingly, while the finger is present in a range where the distance is larger than the second distance and equal to or less than the first distance, focus-adjustment is performed. Thus, image-capturing can be performed at the best timing (in other words, image-capturing can be achieved without missing an image-capturing opportunity), as compared with the case of performing focus-adjustment when image-capturing is performed (i.e., the shutter is released).

In the above configuration, the predetermined function is at least one of focus-adjustment, exposure-adjustment, and white-balancing.

According to the above configuration, at least one of focus-adjustment, exposure-adjustment, and white-balancing is performed before image-capturing is performed. Consequently, image-capturing can be performed at the best timing, as compared with the case of performing focus-adjustment or the like when image-capturing is performed.

In the above configuration, when the distance is equal to or less than the first distance and larger than the second distance being less than the first distance, the execution of the predetermined function on a predetermined area in the display portion is started.

According to the above configuration, when the distance between the touch panel and the indicator is equal to or less than the first distance and larger than the second distance being less than the first distance, the execution of the predetermined function on a predetermined area in the display portion is started.

Incidentally, assuming that, e.g., the function of performing focus-adjustment is employed as the predetermined function, that a finger is used as the indicator, and that the center of an image is the predetermined area, when the distance between the touch panel and the finger is equal to or less than the first distance, and larger than the second distance being less than the first distance, focus-adjustment is performed at the center of an image. Accordingly, while the finger is present in a range where the distance is larger than the second distance and equal to or less than the first distance, focus-adjustment is performed onto a predetermined area. Thus, imaging adapted to bring a predetermined area into focus can be performed.

In the above configuration, when the distance is equal to or less than the first distance and larger than the second distance being less than the first distance, the execution of the predetermined function on an area corresponding to the indicator in the display portion is started.

According to the above configuration, when the distance between the touch panel and the indicator is equal to or less than the first distance and larger than the second distance being less than the first distance, the execution of the predetermined function onto an area corresponding to the indicator in the display portion is started.

Incidentally, assuming that the predetermined function is, e.g., the function of performing focus-adjustment, and the indicator is a finger, when the distance between the touch panel and the finger is equal to or less than the first distance and larger than the second distance being smaller than the first distance, focus-adjustment is performed on an area designated by the finger. Accordingly, while the finger is present in a range where the distance is larger than the second distance and equal to or less than the first distance, the focus-adjustment is performed on the area designated by the indicator. Thus, imaging adapted to bring the area designated by the indicator into focus can be performed.

In the above configuration, the memory is included. When the distance becomes equal to or less than the second distance and equal or larger than 0, the memory stores an image imaged by the imaging portion.

According to the above configuration, the imaged image can be stored in the memory.

In the above configuration, the second distance is 0.

According to the above configuration, image-capturing is performed by making the indicator touch the touch panel.

In the above configuration, the indicator is a finger or a pen.

An imaging method according to the invention is an imaging method that can be utilized in an imaging device which includes an imaging portion, a display portion, and a touch panel arranged to overlap with the display portion and capable of detecting a distance to an indicator. The imaging method includes a step of starting execution of a predetermined function when the distance is equal to or less than the first distance and larger than a second distance less than the first distance, and a step of making the display portion display the image captured by the imaging portion when the distance becomes then equal to or less than the second distance and equal to or more than 0.

According to the above method, the distance between the touch panel and the indicator is equal to or less than the first distance and larger than the second distance being smaller than the first distance, the predetermined function is executed. Then, when the distance between the indicator and the touch panel becomes equal or less than the second distance and equal to or more than 0, the captured image is displayed.

Incidentally, assuming that, e.g., a focus-adjustment function is employed as the predetermined function, and that a finger is used as the indicator, the focus-adjustment is performed in a case where the distance between the touch panel and the finger is equal to or less than the first distance and larger than the second distance being less than the first distance. Then, when the distance between the touch panel and the finger becomes equal to or less than the second distance and equal to or more than 0, the captured image is displayed. Accordingly, while the finger is present in a range where the distance is larger than the second distance and equal to or less than the first distance, focus-adjustment is performed. Thus, image-capturing can be performed at the best timing (in other words, image-capturing can be achieved without missing an image-capturing opportunity), as compared with the case of performing focus-adjustment when image-capturing is performed (i.e., the shutter is released).

An imaging device according to the invention includes an imaging portion capable of capturing an image, a display portion, and a touch panel arranged to overlap with the display portion and capable of detecting a distance to an indicator. If, for a predetermined time, the distance is equal to or less than the first distance and larger than the second distance being less than the first distance, the display portion displays the image.

According to the above configuration, if, for a predetermined time, the distance between the touch panel and the indicator is equal to or less than the first distance and larger than the second distance being less than the first distance, the imaged image is displayed. Accordingly, image-capturing is performed only by putting, for a predetermined time, the indicator in a range where the distance from the touch panel is larger than the second distance and equal to or less than the first distance. Consequently, operability can be improved.

In the above configuration, the memory is included. If, for a predetermined time, the distance is equal to or less than the first distance and larger than the second distance being less than the first distance, the display portion displays the image. In addition, the memory stores the image.

According to the above configuration, the imaged image can be stored in the memory.

In the configuration, the memory is detachably mounted.

According to the above configuration, the memory is made portable and replaceable.

In the configuration, when the distance is equal to or less than the first distance and larger than the second distance being less than the first distance, the display portion indicates that image-capturing timing is approaching.

According to the above configuration, when the distance between the touch panel and the indicator is equal to or less than the first distance and larger than the second distance being smaller than the first distance, it is indicated that image-capturing timing is approaching. Thus, a user can know image-capturing timing and perform image-capturing at the best timing.

In the above configuration, it is schematically indicated that the image-capturing timing is approaching.

According to the above configuration, a user can know image-capturing timing and perform image-capturing at the best timing.

An imaging method according to the invention is an imaging method that can be utilized in an imaging device which includes an imaging portion capable of imaging an image, a display portion, and a touch panel arranged to overlap with the display portion and capable of detecting a distance to an indicator. If, for a predetermined time, the distance is equal to or less than the first distance and larger than the second distance being less than the first distance, the display portion displays the image.

According to the above method, if, for a predetermined time, the distance is equal to or less than the first distance and larger than the second distance being less than the first distance, the captured image is displayed. Accordingly, image-capturing is performed only by putting, for a predetermined time, the indicator in a range where the distance from the touch panel is larger than the second distance and equal to or less than the first distance. Consequently, operability can be improved.

Advantages of the Invention

According to the invention, an imaging device equipped with an electrostatic-capacitance touch panel can capture a camera-shake-free image.

Figure 1:
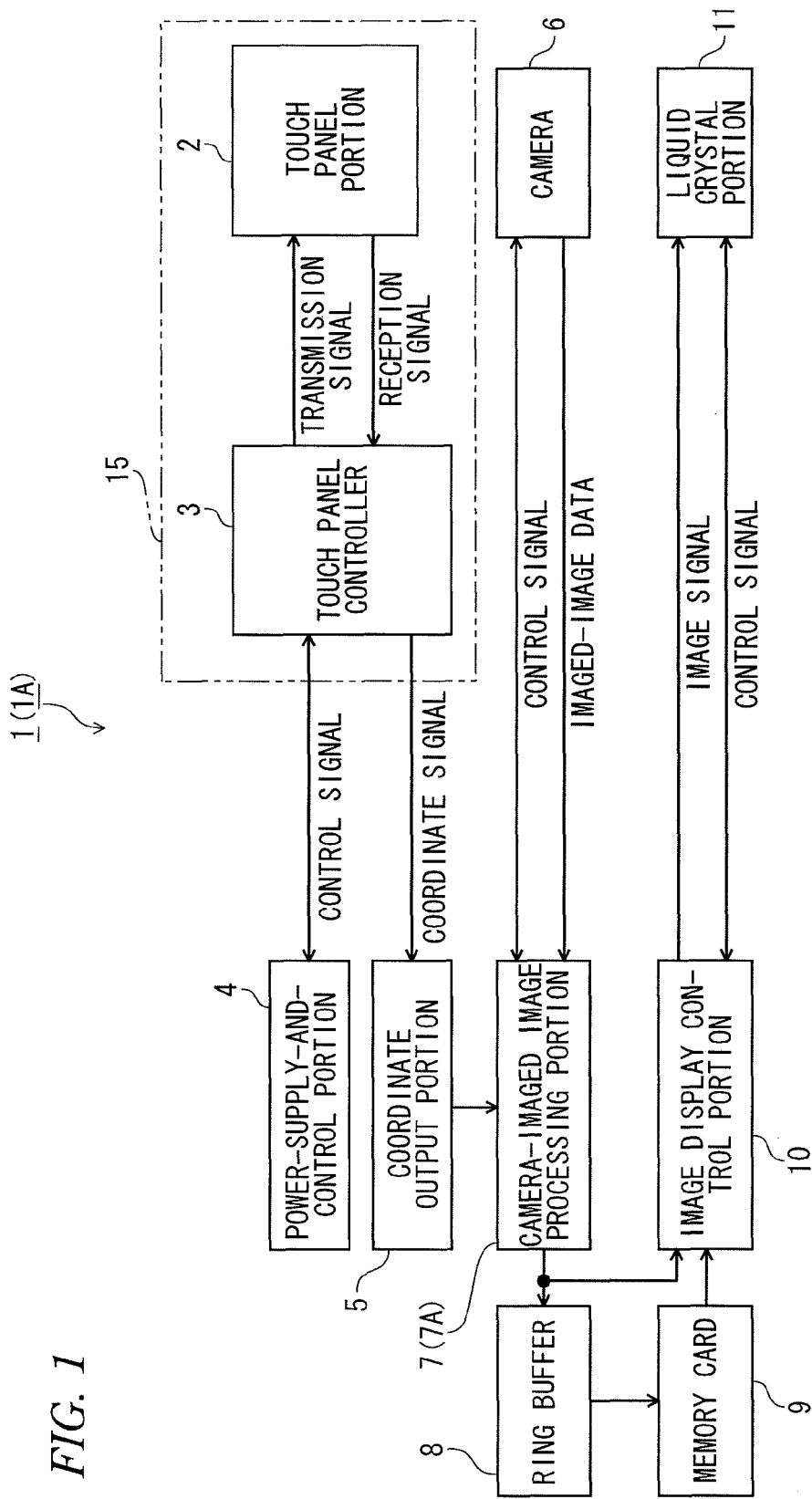
FIG. 1 is a block diagram illustrating a schematic configuration of an imaging device according to a first embodiment of the invention.
Figure 4:
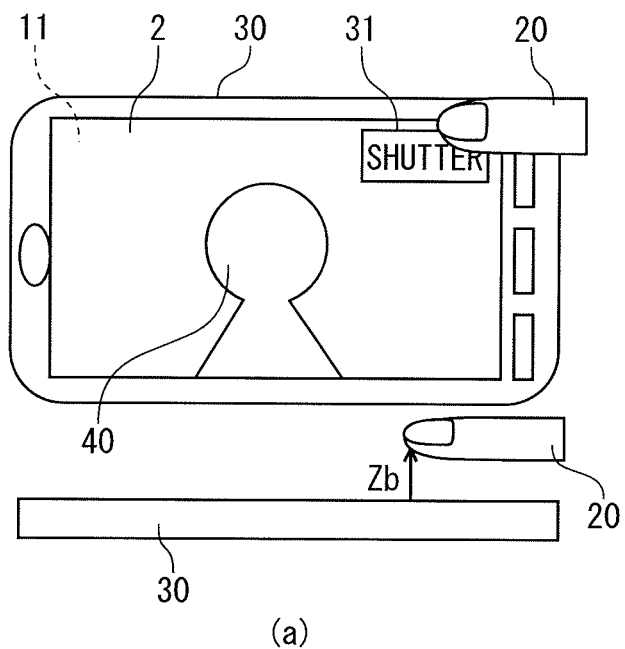
Figure 4:
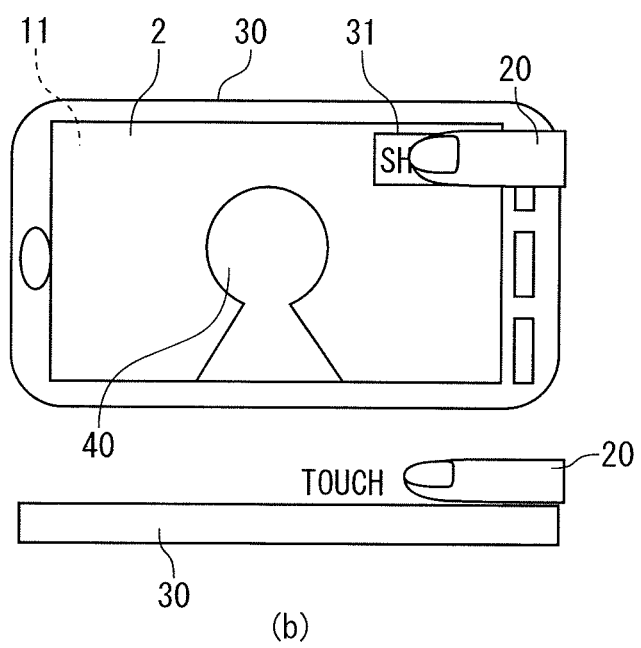

Sections (a) and (b) of FIG. 4 are diagrams each illustrating a manner of capturing an image by a smartphone equipped with the imaging device illustrated in FIG. 1.

Figure 5:
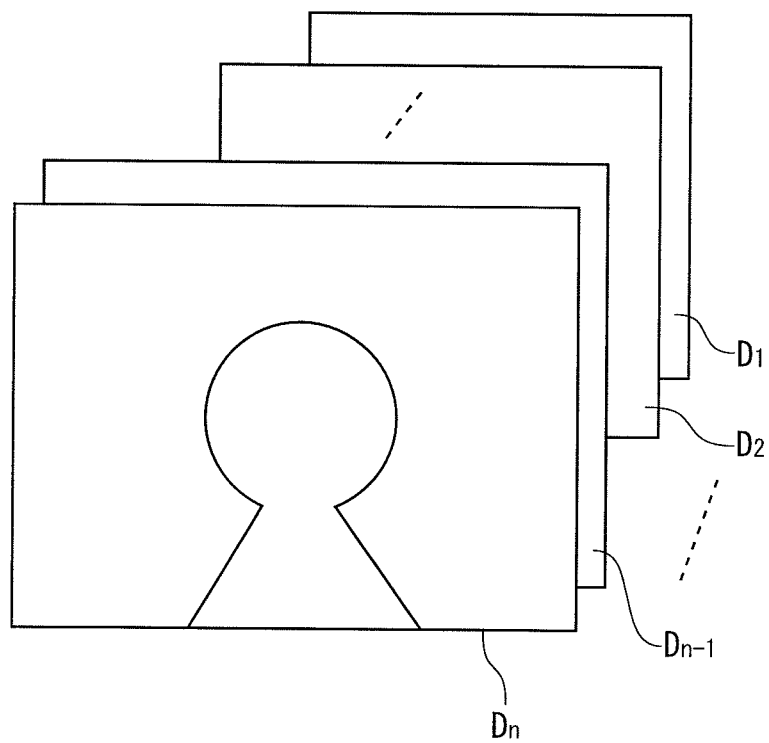

FIG. 5 is a diagram schematically illustrating imaged-image data stored in a ring buffer of the imaging device illustrated in FIG. 1.

Figure 6:
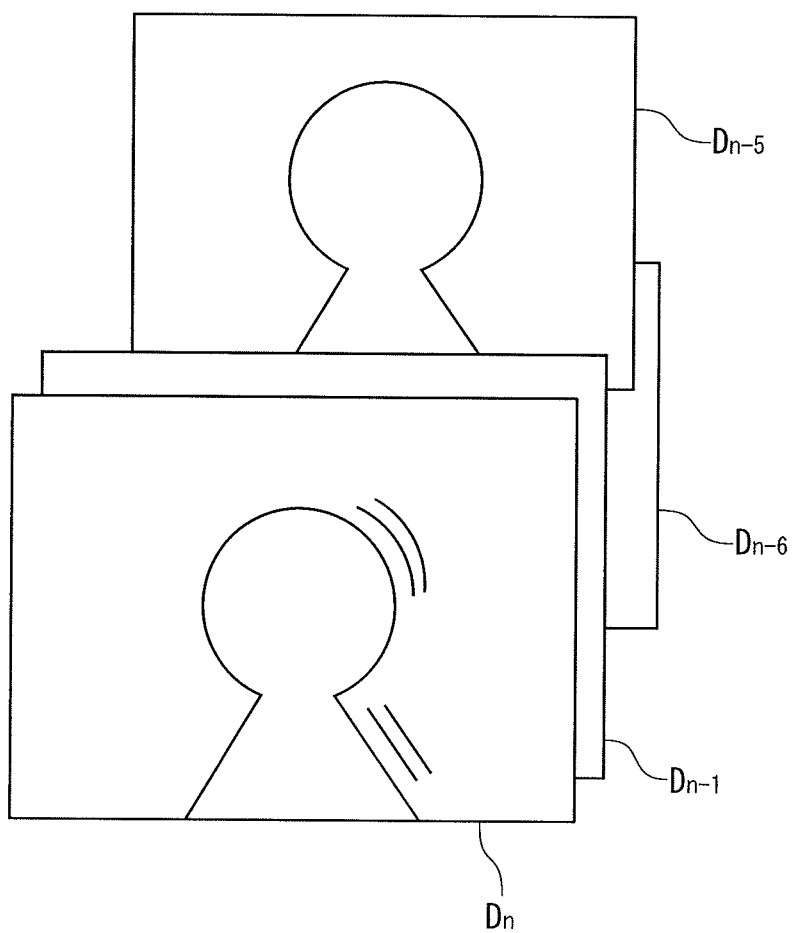

FIG. 6 is a schematically illustrating a state of capturing out an image imaged several pieces before another image imaged when a shutter-icon is depressed in the imaging device illustrated in FIG. 1.

Figure 7:
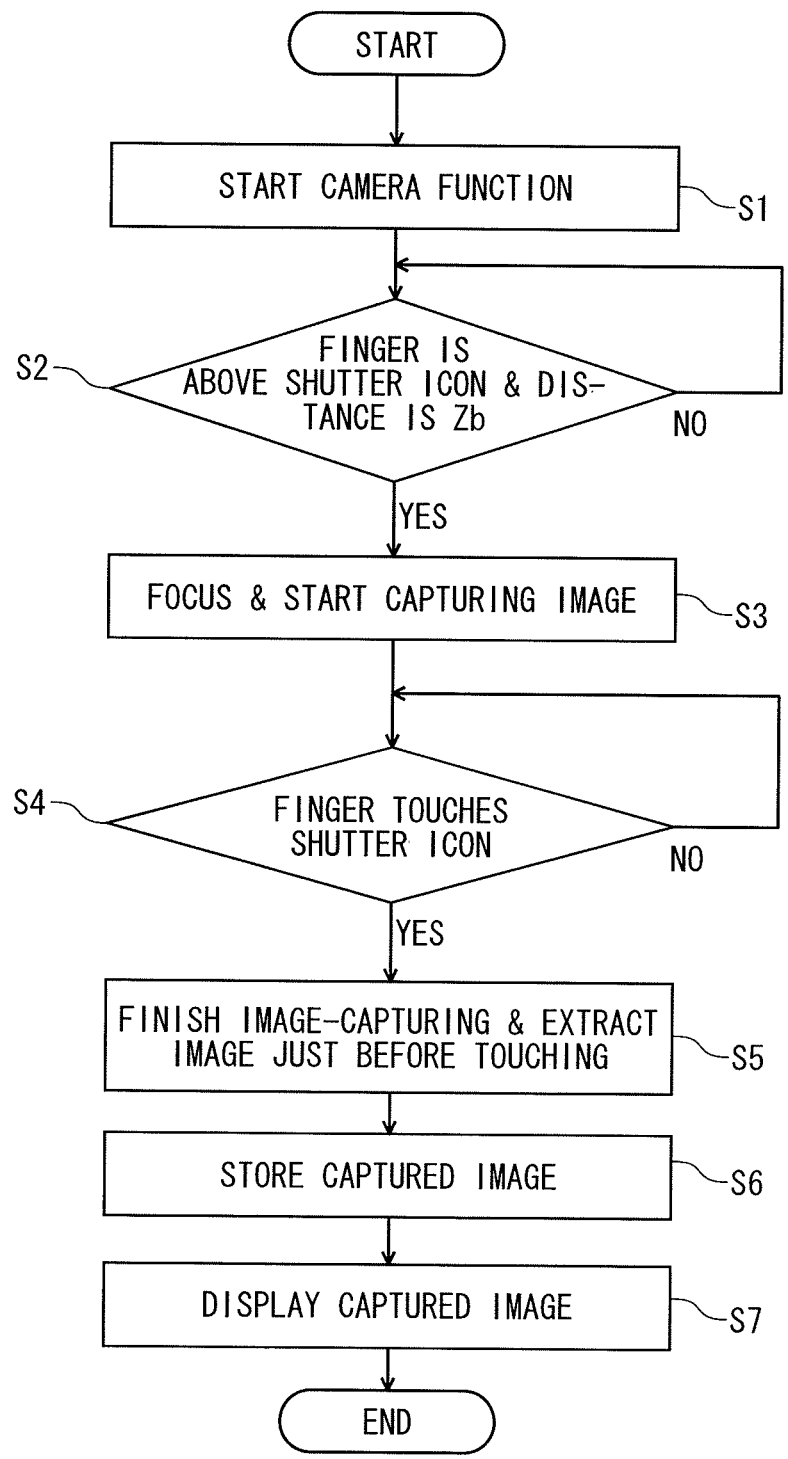

FIG. 7 is a flowchart illustrating processing from start of a camera function of the imaging device illustrated in FIG. 1 to display of an imaged image.

Figure 8:
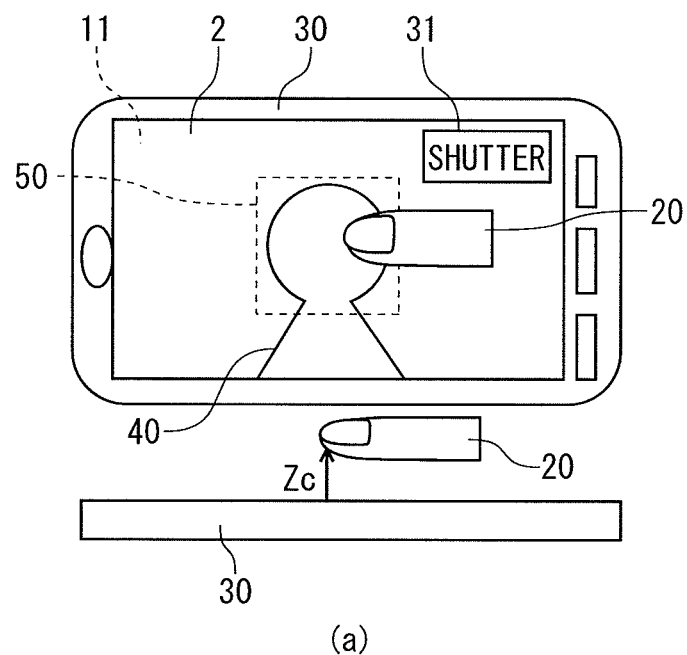
Figure 8:
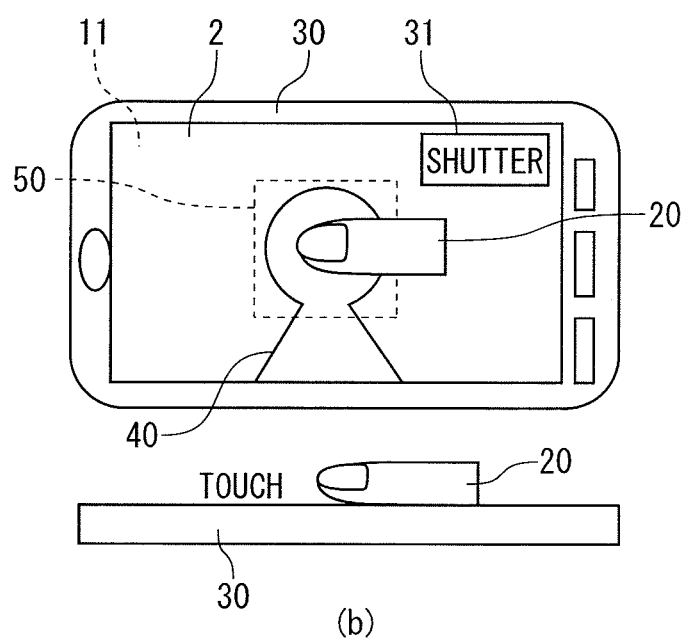

Sections (a) and (b) of FIG. 8 are diagrams each illustrating a manner of capturing an image by a smartphone equipped with an imaging device according to a second embodiment of the invention.

Figure 9:
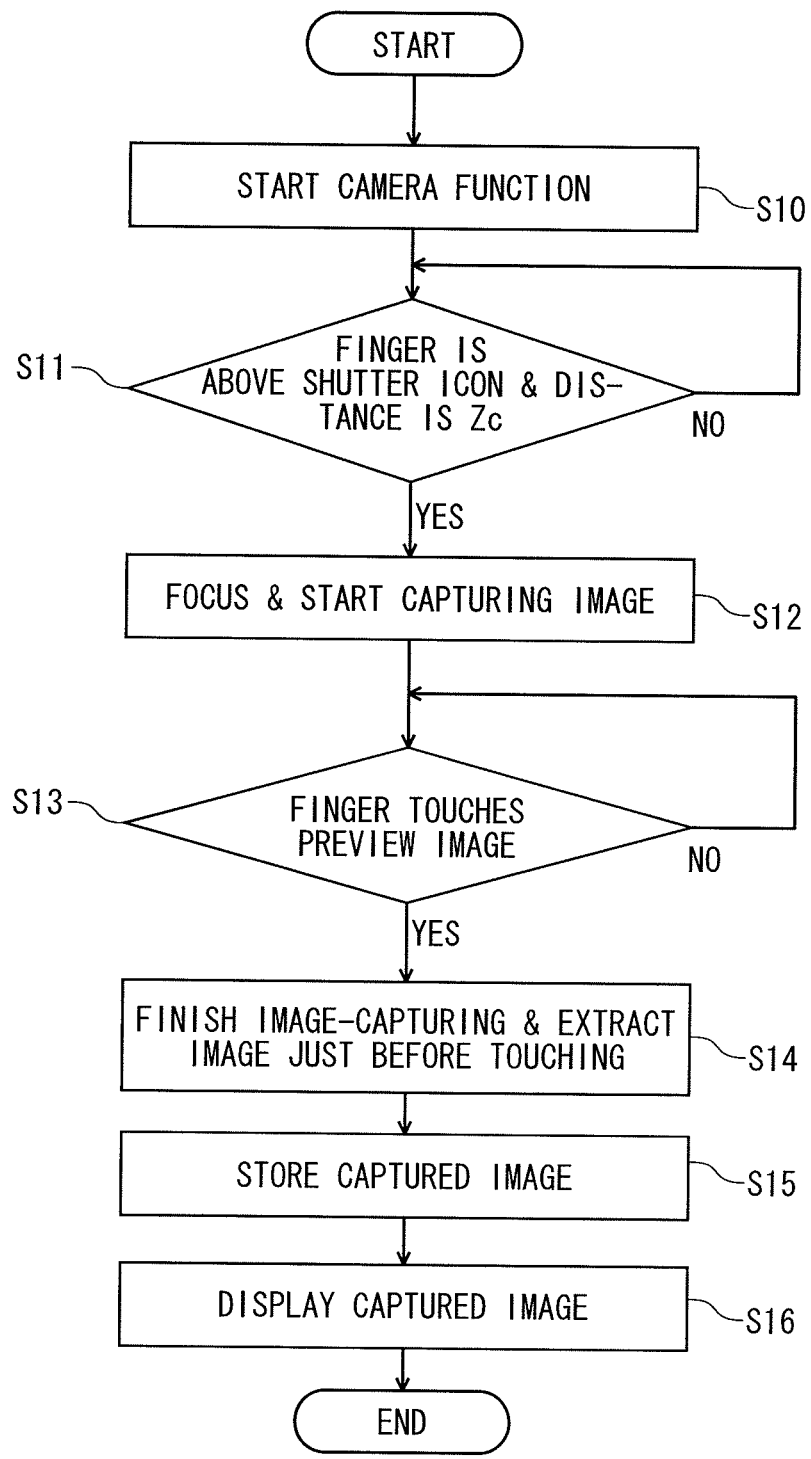

FIG. 9 is a flowchart illustrating processing from start of a camera function of the imaging device illustrated in Sections (a) and (b) of FIG. 8 to display of an imaged image.

Figure 10:
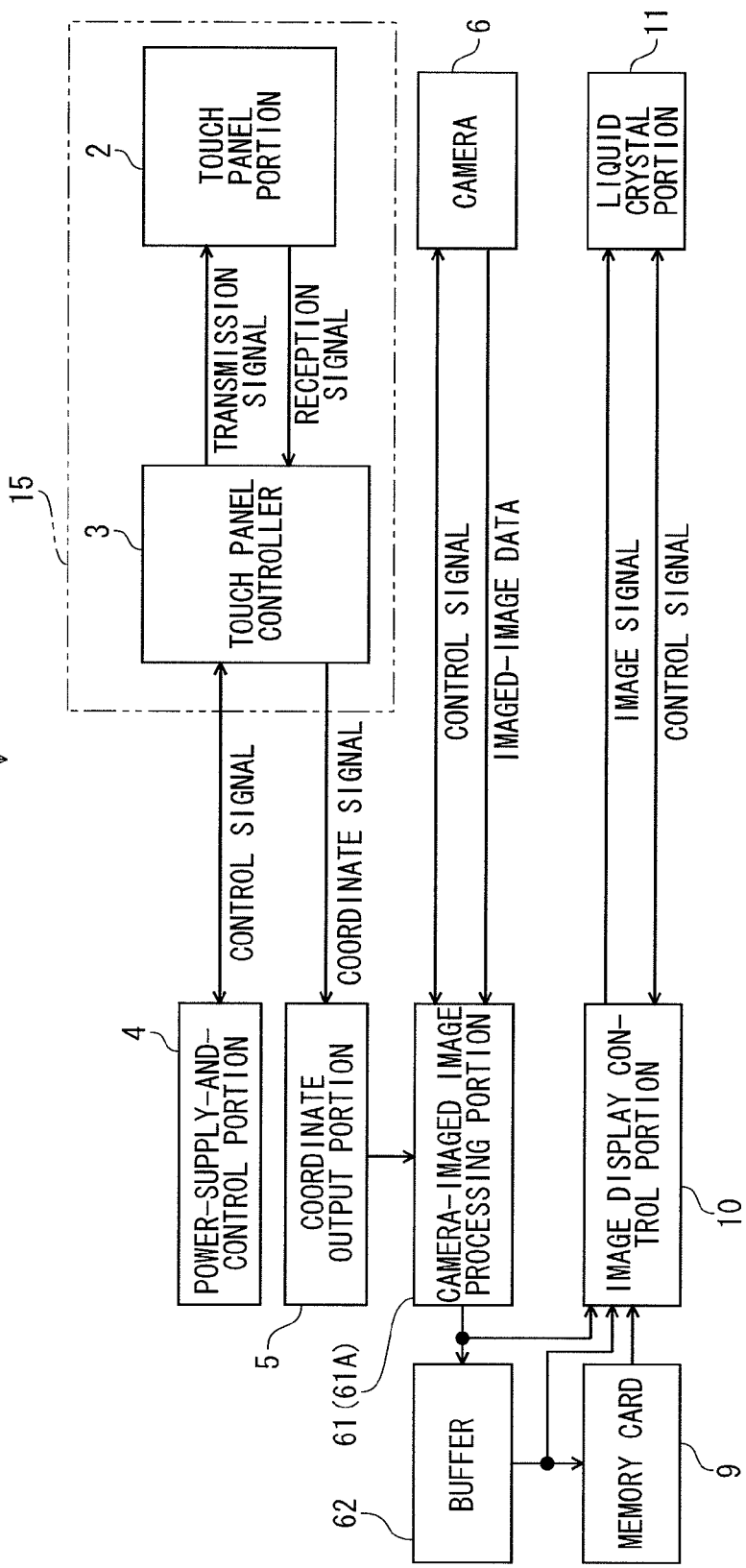

FIG. 10 is a block diagram illustrating a schematic configuration of an imaging device according to a third embodiment of the invention.

Figure 11:
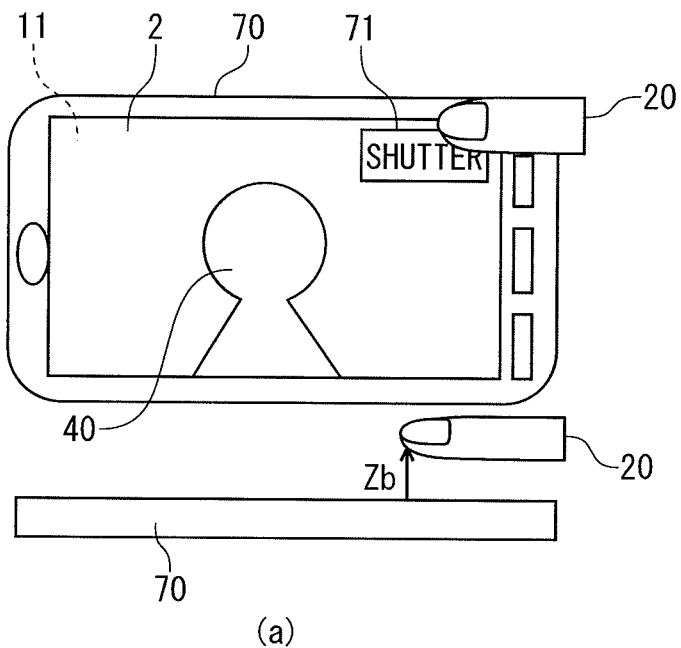
Figure 11:
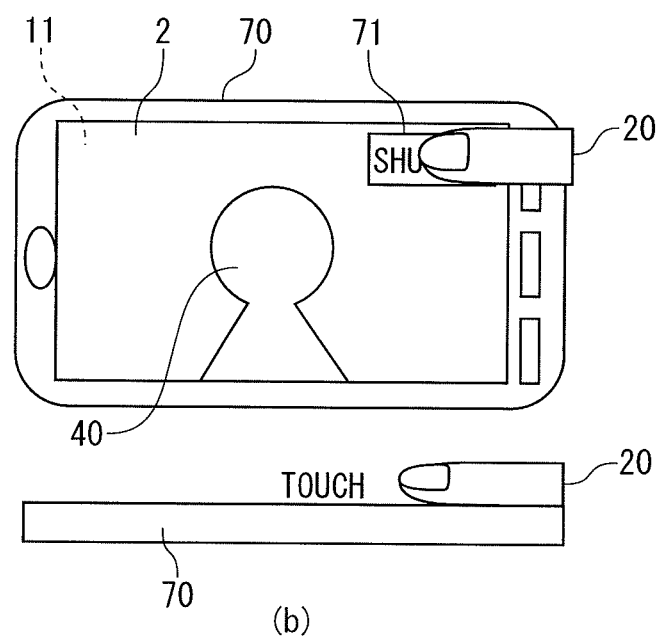

Sections (a) and (b) of FIG. 11 are diagrams each illustrating a manner of capturing an image by a smartphone equipped with the imaging device illustrated in FIG. 10.

Figure 12:
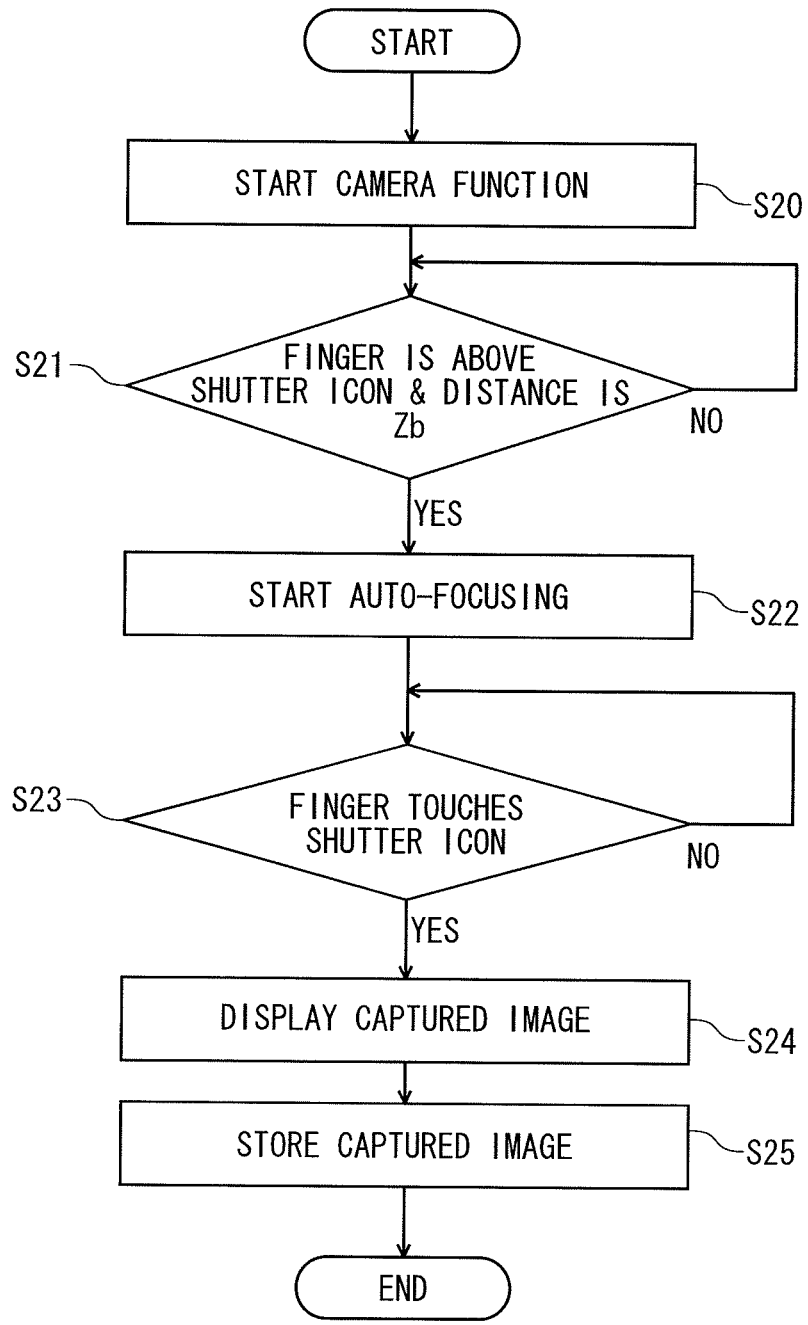

FIG. 12 is a flowchart illustrating processing from start of a camera function of the imaging device illustrated in FIG. 10 to storage of a captured image.

Figure 13:
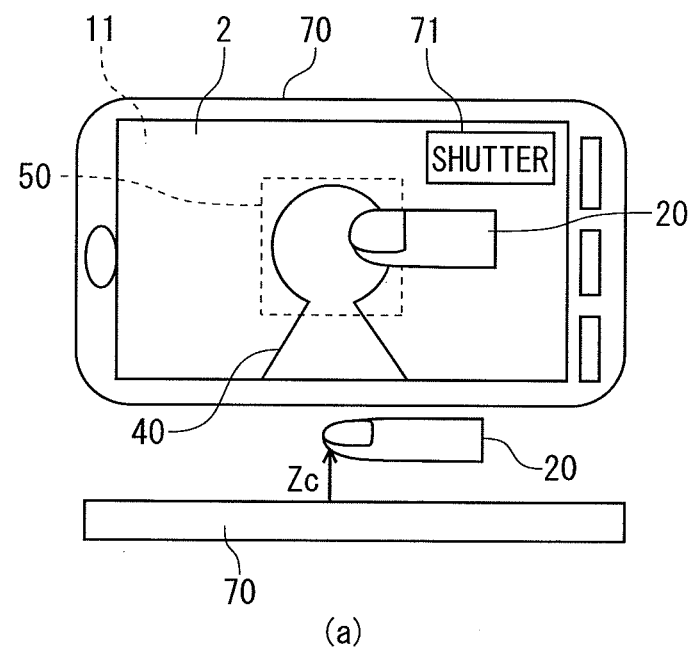
Figure 13:
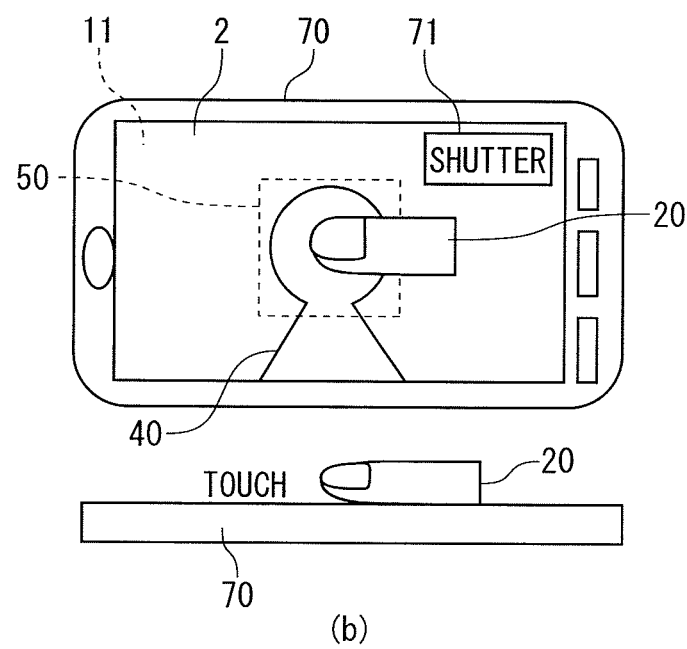

Sections (a) and (b) of FIG. 13 are diagrams each illustrating a manner of capturing an image by a smartphone equipped with an imaging device according to a fourth embodiment of the invention.

Figure 14:
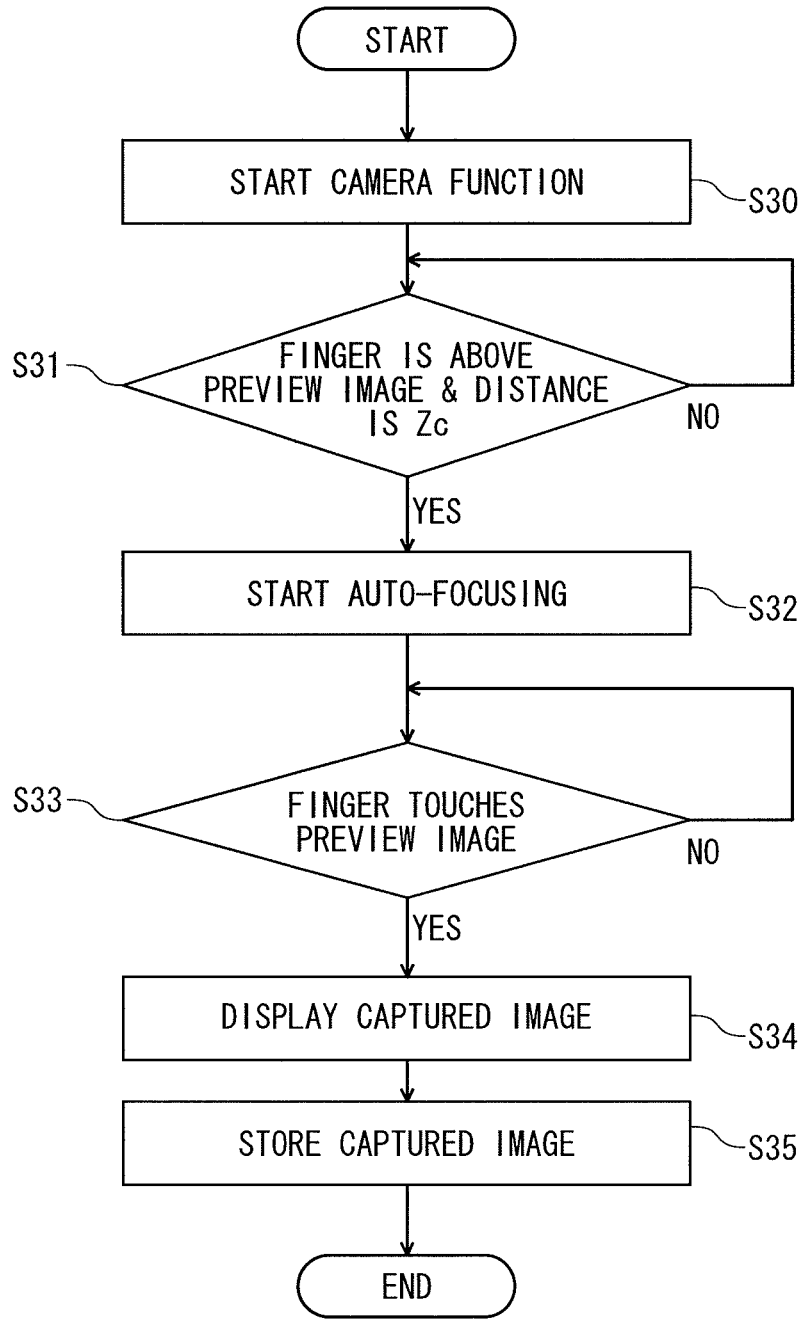

FIG. 14 is a flowchart illustrating processing from start of a camera function of the imaging device according to the fourth embodiment of the invention to storage of a captured image.

Figure 15:
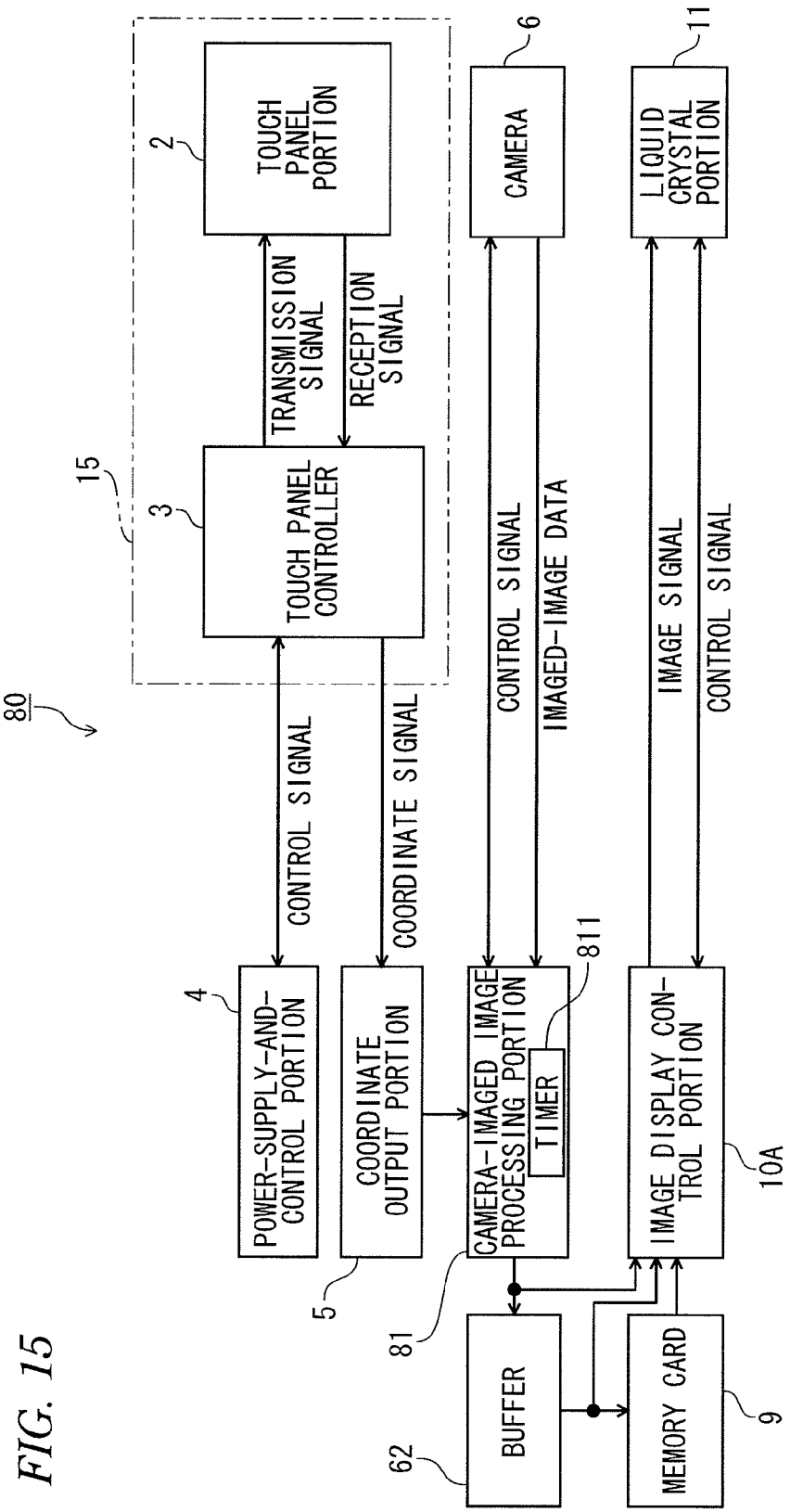

FIG. 15 is a block diagram illustrating a schematic configuration of an imaging device according to a fifth embodiment of the invention.

Figure 16:
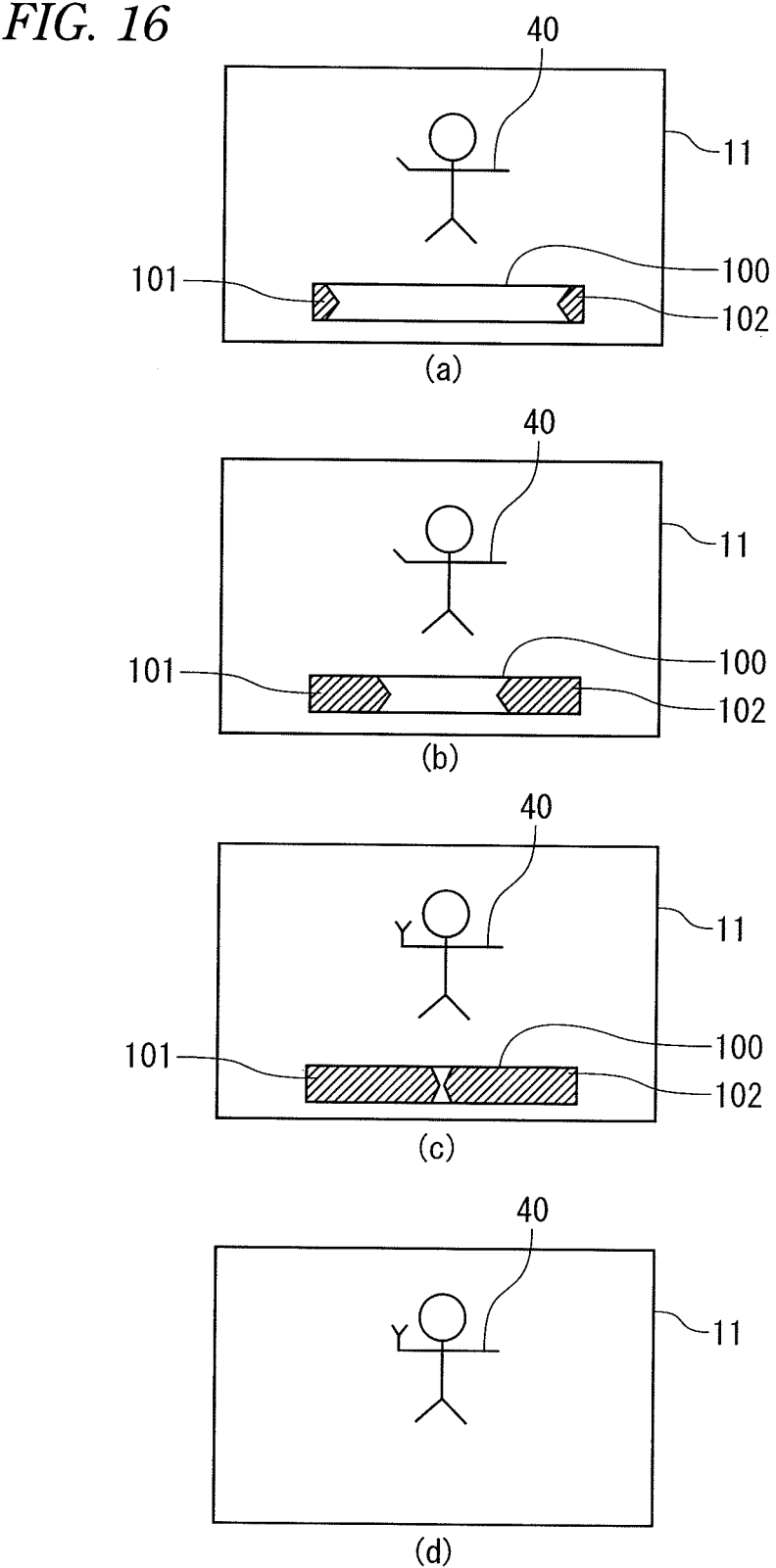

Sections (a) to (d) of FIG. 16 are diagrams illustrating an example of schematically indicating that image-capturing timing is approaching.

Figure 17:
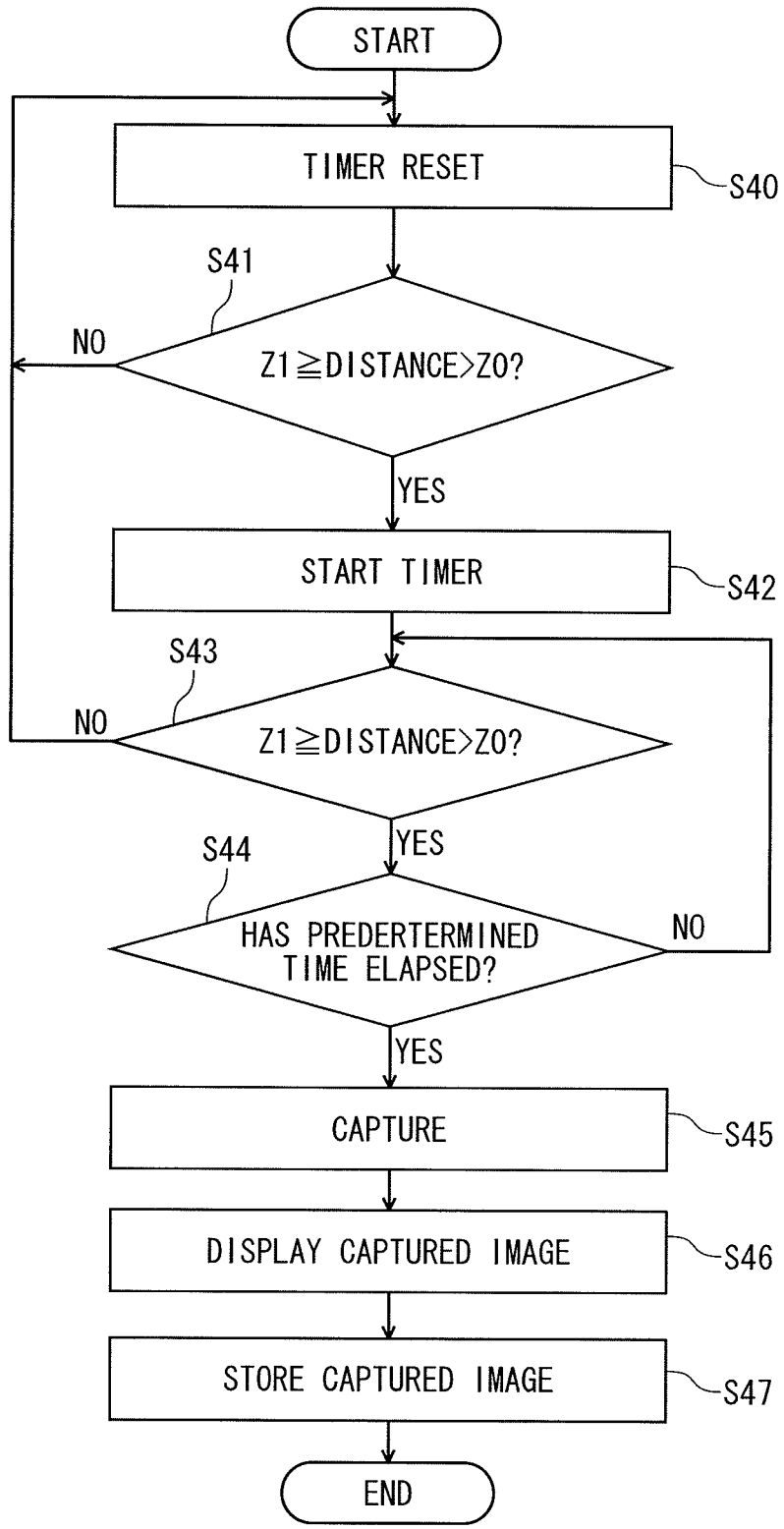

FIG. 17 is a flowchart illustrating processing from reset of a timer of the imaging device illustrated in FIG. 15 to storage of a captured image.

BEST MODE FOR CARRYING OUT THE INVENTION

Hereinafter, preferred embodiments for carrying out the invention are described with reference to the accompanying-drawings.

First Embodiment

FIG. 1 is a block diagram illustrating a schematic configuration of an imaging device according to a first embodiment of the invention. The imaging device 1 according to the present embodiment of the invention is mounted in a portable wireless device called a smartphone. A communicative part of the imaging device, which functions as a wireless device, is omitted.

In FIG. 1, the imaging device 1 according to the present embodiment includes a touch panel portion 2, a touch panel controller 3, a power-supply-and-control portion 4, a coordinate output portion 5, a camera (imaging portion) 6, a camera-imaged image processing portion 7, a ring buffer (memory (particularly, first memory)) 8, a memory card (second memory) 9, an image display control portion 10, and a liquid crystal portion (display portion) 11. In the imaging device 1 according to the present embodiment, the touch panel portion 2 and the touch panel controller 3 configure a touch panel module (touch panel) 15.

The touch panel controller 3, the power-supply-and-control portion 4, the coordinate output portion 5 and the camera-imaged image processing portion 7 are configured by a central processing unit (CPU), a read-only memory (ROM), a random access memory (RAM), and an interface circuit. The ROM stores a program for controlling the CPU. The RAM is used in an operation of the CPU. Apparently, each of the touch panel controller 3, the power-supply-and-control portion 4, the coordinate output portion 5, and the camera-imaged image processing portion 7 can be a single unit.

The touch panel module 15 employs an electrostatic-capacitance system that enables an operation ("hovering operation") to be performed at a predetermined range of height without touching a panel surface with a finger. The touch panel portion 2 is arranged to overlap with the liquid crystal portion 11. The touch panel portion 2 includes a transmission electrode and a reception electrode (not shown), which are arranged under a bottom surface of a plate-like dielectric to be spaced each other. A driving signal based on a transmission signal output from the touch panel controller 3 is applied to the transmission electrode. The application of the driving signal to the transmission electrode results in generation of an electric field from the transmission electrode. When an indicator (such as a finger or a pen (according to the present embodiment, the indicator is assumed to be a finger)) enters the electric field, the number of lines of electric force between the transmission electrode and the reception electrode decreases. Change in the number of lines of electric force appears as a change of electric-charge of the reception electrode. A reception signal according to the change of electric-charge of the reception electrode is output to the touch panel controller 3. The touch panel controller 3 gives and receives control signals to and from the power-supply-and-control portion 4 and outputs transmission signals to the touch panel portion 2. The touch panel controller 3 also receives reception signals output from the touch panel portion 2, detects a finger from the received reception signals, and outputs a coordinate signal representing a position of the detected finger to the coordinate output portion 5.

Figure 2:
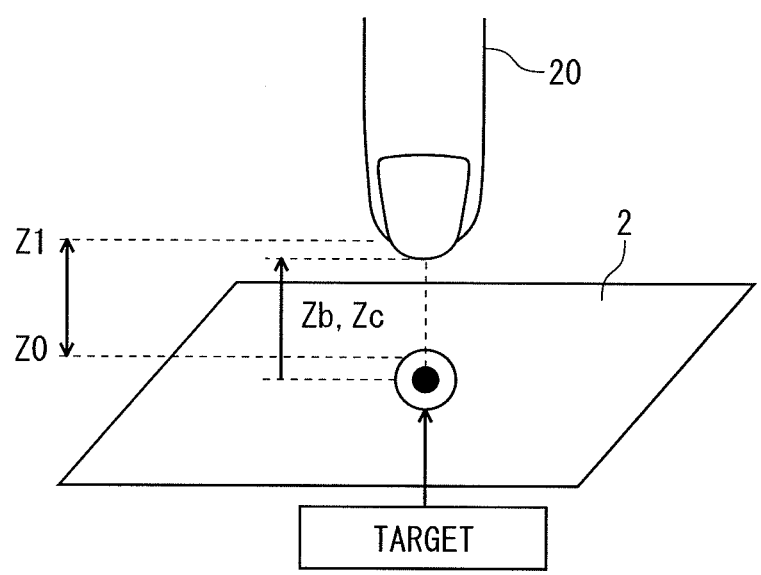
FIG. 2 is a flowchart illustrating a finger detection method performed in a touch panel controller of the imaging device illustrated in FIG. 1.
Figure 3:
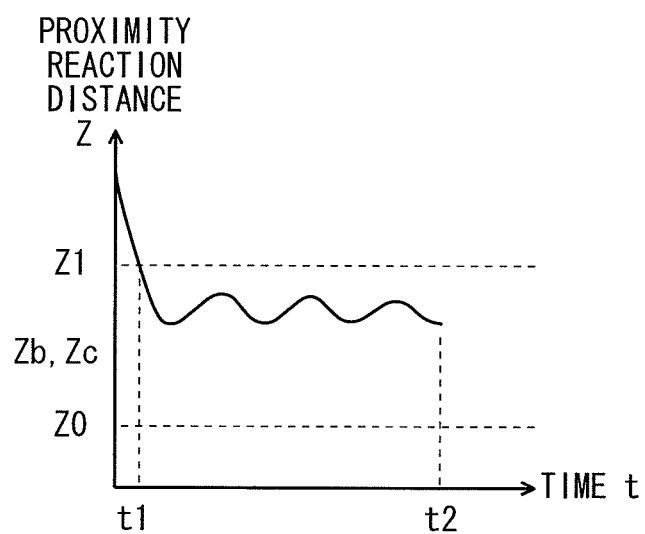
FIG. 3 is a graph illustrating temporal change of a distance between a touch panel portion of the imaging device illustrated in FIG. 1 and a finger.

FIG. 2 is a flowchart illustrating a finger detection method performed in the touch panel controller 3. In FIG. 2, the touch panel controller 3 detects a finger 20 when a distance Zb (or Zc) according to a level of a reception signal output from the touch panel portion 2 (i.e., a distance from the finger 20 to the touch panel portion 2) is between a first distance Z1 and a second distance Z0. At that time, the distance is calculated as an average value within a predetermined time in view of a shake of a finger 20. FIG. 3 is a graph illustrating temporal change of the distance between the finger 20 and the touch panel portion 2. As illustrated in FIG. 3, an average value of the distance is calculated between a first distance Z1 and a second distance Z0 in a time from a moment t1 to a moment t2. When the average value of the distance is between the first distance Z1 and the second distance Z0, the apparatus detects the finger 20. Incidentally, the above distance Zb is a distance assumed in case of performing a one-hand operation. The above distance Zc is a distance assumed in case of performing a two-hand operation. Details of the distances Zb and Zc are described below.

Referring back to FIG. 1, the power-supply-and-control portion 4 gives and receives control signals to and from the touch panel controller 3 and supplies a power-supply voltage to each part of the apparatus. The coordinate output portion 5 captures in coordinate signals output from the touch panel controller 3 and outputs the coordinate signal to the camera-imaged image processing portion 7. In this case, the coordinate signal output from the touch panel controller 3 indicates a position (X, Y, Z) of a finger on the touch panel portion 2. The camera 6 captures an image of an object according to a control signal output from the camera-imaged image processing portion 7 and outputs imaged-image data to the camera-imaged image processing portion 7.

The camera-imaged image processing portion 7 outputs, to the camera 6, control signals for camera-control operations, such as focusing and white-balancing, and receives imaged-image data output from the camera 6. The camera-imaged image processing portion 7 determines finger proximity from a coordinate signal corresponding to Z-axis direction among coordinate signals output from the coordinate output portion 5. Besides, the camera-imaged image processing portion 7 determines whether a finger is present in midair of a shutter-icon (i.e., a predetermined icon displayed at a predetermined location on the liquid crystal portion 11 during the camera operates). When the finger is present in midair (this is referred to as "shutter-icon midair") of the shutter-icon, the camera-imaged image processing portion 7 determines a distance to the finger. That is, a distance between the touch panel portion 2 and the finger is determined. When the distance is equal to or less than a first distance and more than a second distance that is less than the first distance, the camera-imaged image processing portion 7 performs focus-adjustment of the camera 6. Then, the camera-imaged image processing portion 7 makes the ring buffer 8 store, at predetermined time intervals, imaged-image data output from the camera 6. The camera-imaged image processing portion 7 also outputs imaged-image data to the image display control portion 10.

After that, when the distance between the touch panel portion 2 and the finger is equal to or less than the second distance and equal to or more than 0, the camera-imaged image processing portion 7 determines that the shutter-icon is depressed (i.e., the shutter is released). Thus, the camera-imaged image processing portion 7 finishes capturing the imaged-image data into the ring buffer 8. Then, the camera-imaged image processing portion 7 extracts one (i.e., an image before the above distance is equal to or less than the second distance, and equal to or more than 0) of images stored in the ring buffer 8, outputs the extracted image to the memory card 9, and makes the memory card 9 store the extracted image. Incidentally, when a finger touches the shutter-icon, the distance between the touch panel portion 2 and the finger is 0.

Sections (a) and (B) of FIG. 4 are diagrams each illustrating a manner of capturing an image by a smartphone 30 equipped with the imaging device 1 according to the present embodiment. Section (a) illustrates a case where the finger 20 is present in midair of the shutter-icon 31. Section (b) illustrates a case where the finger 20 touches the shutter-icon 31. Incidentally, FIG. 4 illustrates the case of performing a one-hand operation on the smartphone 30. Thus, the distance for detecting the finger 20 is set to be Zb. In the case of performing a one-hand operation, the finger 20 is closer to the touch panel portion 2 than the finger 20 in the case of performing a two-hand operation. Therefore, in order to set a low reaction distance, the distance is set at Zb (<Zc). An object 40 is displayed at the center of a screen of the liquid crystal portion 11.

FIG. 5 is a diagram schematically illustrating imaged-image data stored in the ring buffer 8. As illustrated in FIG. 5, plural captured-images $D_1, D_2, \ldots D_{n-1}, D_n$ obtained at predetermined time intervals are stored in the ring buffer 8. FIG. 6 is a schematically illustrating a state of capturing out an image imaged several pieces before another image imaged when the shutter-icon 31 is depressed (or touched). As illustrated in FIG. 6, an imaged-image $D_{n-5}$ stored several pieces before the image $D_n$ imaged upon depressing the shutter-icon 31 is captured out. When the shutter-icon 31 is depressed, camera shake tends to occur. Thus, a camera-shake-free captured-image can be obtained by acquiring an imaged-image stored several pieces before another imaged-image obtained when the shutter-icon 31 is depressed.

Referring back to FIG. 1, the image display control portion 10 gives and receives control signals to and from the liquid crystal portion 11 and generates image signals from imaged-image data output from the camera-imaged image processing portion 7. Then, the image display control portion 10 outputs the generated image signals to the liquid crystal portion 11 to display a preview image. The image display control portion 10 also reads an image (i.e., an image before the distance between the touch panel portion 2 and the finger becomes equal to or less than the second distance and equal to or more than 0) stored in the memory card 9 and generates an image signal. Then, the image display control portion 10 outputs the generated image signal to the liquid crystal portion 11 to display the read image. The liquid crystal portion 11 has a liquid crystal display (LCD). However, the liquid crystal portion 11 may have an organic electro-luminescence (EL) display instead of LCD. A volatile memory, such as a DRAM, is used as the ring buffer 8. A nonvolatile memory, such as a flash memory, is used as the memory card 9. Apparently, the memory card 9 is detachably attached to the body of the apparatus.

Next, the imaging device 1 according to the present embodiment is described hereinafter.

FIG. 7 is a flowchart illustrating processing from start of a camera function of the imaging device 1 according to the present embodiment to display of a captured image. In FIG. 7, the camera-imaged image processing portion 7 starts a camera function in step S1. When starting the camera function, in step S2, the camera-imaged image processing portion 7 determines whether a user's finger 20 is present in midair of the shutter-icon 31 and whether the distance between the touch panel portion 2 and the finger 20 is Zb. When the conditions are not satisfied in the determination, the determination is repeated until the conditions are satisfied. When the conditions are satisfied, in step S3, the camera-imaged image processing portion 7 performs focus-adjustment on the camera 6 and starts capturing the image into the ring buffer 8.

After starting capturing the image, in step S4, the camera-imaged image processing portion 7 determines whether the finger 20 touches the shutter-icon 31. When the shutter-icon 31 is not touched, the present determination is repeated until the shutter-icon 31 is touched. When touched, in step S5, capturing the images is finished, and the image just before the finger 20 touches the shutter-icon 31 (e.g., the image imaged several pieces before the image imaged closest to timing of touching the shutter-icon 31) is extracted. Then, in step S6, the extracted image is stored in the memory card 9. When the extracted image is stored in the memory card 9, in step S7, the image display control portion 10 reads this image from the memory card 9 and displays the read image on the liquid crystal portion 11. After the captured image is displayed, the present processing is finished.

Thus, in the imaging device 1 according to the first embodiment, when the distance between the touch panel portion 2 and the finger 20 serving as the indicator is larger than the second distance, and equal to or smaller than the first distance, the images captured by the camera 6 are stored in the ring buffer 8 at predetermined time intervals. Then, when the distance between the finger 20 and the touch panel portion 2 becomes equal to or less than the second distance and also becomes equal to or more than 0, storing the images in the ring buffer 8 is stopped. One piece of the images stored in the ring buffer 8 is extracted and displayed on the liquid crystal portion 11. Accordingly, camera-shake-free images can be captured.

When the distance between the finger 20 and the touch panel portion 2 is equal to or smaller than the first distance and larger than the second distance, the image imaged by the camera 6 is displayed. Thus, an image (i.e., a preview image) before captured can be checked.

Although a program describing processing illustrated in the flowchart of FIG. 7 is stored in ROM in the imaging device 1 according to the first embodiment, the imaging device 1 may be configured such that the program can be distributed by being stored into a storage medium such as a magnetic disk, an optical disc, a magneto-optical disc, and a flash memory or that the program can be downloaded utilizing an electric telecommunication line by being stored in a server (not shown) on a network such as the Internet.

Second Embodiment

Sections (a) and (b) of FIG. 8 are diagrams each illustrating a manner of capturing an image by a smartphone equipped with an imaging device according to a second embodiment of the invention. In FIG. 8, each part common to the above apparatuses illustrated in Sections (a) and (b) of FIG. 8 is designated with a same reference numeral as used to a corresponding part of the imaging device illustrated in Sections (a) and (b) of FIG. 4. The imaging device according to the second embodiment and the imaging device 1 according to the first embodiment have a common configuration. Therefore, FIG. 1 is invoked. In this case, an imaging device 1A according to the second embodiment includes a camera-imaged image processing portion 7A to which a new function is added.

The imaging device 1 according to the above first embodiment can capture an image only by performing an operation on the shutter-icon 31. However, the imaging device 1A according to the second embodiment can capture an image by designating a preview image to be focused, in addition to performing the operation on the shutter 31. For example, the finger 20 is brought to midair of a preview image (representing, e.g., the object 40) and moved downwardly to a position, the distance to which from the touch panel portion 2 is equal to or less than Zc. Next, a rectangular focus mark 50 is displayed at the position. Then, the camera-imaged image processing portion 7 performs the focus-adjustment and starts imaging an image. Designating a preview image to be focused enables imaging an image under a condition in which the preview image is brought into focus. In a case of operating the shutter-icon 31, imaging an image that is wholly in focus can be achieved. Incidentally, as described above, when a both-hand operation is performed, the shutter-icon 31 is operated by a hand opposite to the other hand holding the smartphone 30. Thus, a reaction distance (i.e., a distance in Z-axis direction) at which the finger 20 of the hand operating the smartphone can be detected is longer than the reaction distance in the case of performing a one-hand operation, so that Zc>Zb. However, this is not indispensable. The reaction distances may be set so that Zc=Zb.

FIG. 9 is a flowchart illustrating processing from start of the camera function of the imaging device 1A according to the second embodiment to display of a captured image. In FIG. 9, in step S10, the camera-imaged image processing portion 7A starts the camera function. When starting the camera function, in step S11, the camera-imaged image processing portion 7A determines whether the finger 20 of a user is present in midair of a preview image and whether the distance between the touch panel portion 2 and the finger 20 is Zc. At the determination, when the conditions are not satisfied, the determination is repeated until the conditions are satisfied. When the conditions are satisfied, in step S12, focus-adjustment is performed on the camera 6. Then, the camera-imaged image processing portion 7A starts capturing an image to the ring buffer 8.

After starting capturing an image, in step S13, the camera-imaged image processing portion 7A determines whether the finger 20 touches the preview image. When the preview image is not touched, the determination is repeated until the preview image is touched. When the preview image is touched, in step S14, capturing an image is finished, and the image just before the finger 20 touches the preview image (e.g., the image imaged several pieces before the image imaged closest to timing of touching the shutter-icon 31) is extracted. Then, in step S15, the extracted image is stored in the memory card 9. When the extracted image is stored in the memory card 9, in step S16, the image display control portion 10 reads this image from the memory card 9 and displays the read image on the liquid crystal portion 11. After the captured image is displayed, the present processing is finished.

Accordingly, even the imaging device 1A according to the second embodiment can capture camera-shake-free images.

Although a program describing processing illustrated in the flowchart of FIG. 9 is stored in ROM in the imaging device 1A according to the second embodiment, the imaging device 1A may be configured such that the program can be distributed by being stored into a storage medium such as a magnetic disk, an optical disc, a magneto-optical disc, and a flash memory or that the program can be downloaded utilizing an electric telecommunication line by being stored in a server (not shown) on a network such as the Internet.

Third Embodiment

FIG. 10 is a block diagram illustrating a schematic configuration of an imaging device according to a third embodiment of the invention. In FIG. 10, each part common to the above apparatuses illustrated in FIGS. 1 and 10 is designated with a same reference numeral as used to a corresponding part of the imaging device 1. The imaging device 60 according to the present embodiment of the invention is mounted in a portable wireless device called a smartphone. A communicative part of the imaging device, which functions as a wireless device, is omitted.

In FIG. 10, the imaging device 60 according to the present embodiment includes a camera-imaged image processing portion 61 that differs partially in the functions from the camera-imaged image processing portion 7 of the imaging device 1 according to the first embodiment. The imaging device 60 also includes an ordinary buffer 62, instead of the ring buffer 8. Each of parts of the imaging device 60, which are other than the camera-imaged image processing portion 61 and the buffer 62, is the same as a corresponding part of the imaging device 1. Therefore, description of each part common to the imaging devices 1 and 60 is omitted.

The camera-imaged image processing portion 61 outputs to the camera 6 control signals for performing auto-focus (i.e., focus-adjustment). In this case, auto-focus is performed onto a predetermined area in the liquid crystal portion 11. The predetermined area is, e.g., the center of an image. Incidentally, the camera-imaged image processing portion 61 may be configured to perform auto-exposure (i.e., exposure-adjustment), or auto-white-balance (i.e., white-balance-adjustment), other than auto-focus.

The camera-imaged image processing portion 61 also receives imaged-image data consecutively output from the camera 6 and outputs the image display control portion 10. The camera-imaged image processing portion 61 also determines the finger proximity from a coordinate signal corresponding to Z-axis direction among coordinate signals output from the coordinate output portion 5. Besides, the camera-imaged image processing portion 61 determines whether a finger is present in midair of the shutter-icon (which is displayed at a predetermined location on the liquid crystal portion 11 during the camera operates). When the finger is present in midair (i.e., "shutter-icon midair") of the shutter-icon, the camera-imaged image processing portion 61 determines a distance to the finger. That is, a distance between the touch panel portion 2 and the finger is determined. When the finger is present in the shutter-icon midair, the camera-imaged image processing portion 61 determines the distance to the finger. That is, the camera-imaged image processing portion 61 determines the distance between the touch panel portion 2 and the finger. At the determination, when the distance is equal to or less than the first distance and more than the second distance being less than the first distance, the camera-imaged image processing portion 61 performs auto-focus on the camera 6. Then, when the distance between the touch panel portion 2 and the finger becomes equal to or less than the second distance and equal to or more than 0, the camera-imaged image processing portion 7 determines that the shutter-icon is depressed (i.e., the shutter is released). The camera-imaged image processing portion 61 makes the ring buffer 62 store imaged-image data of 1 frame output from the camera 6. The camera-imaged image processing portion 7 also outputs imaged-image data stored in the buffer 62 to the image display control portion 10 so that a user can recognize a currently imaged image. Incidentally, when the finger touches the shutter-icon, the distance between the touch panel portion 2 and the finger is 0.

When an instruction for storing imaged-image data stored in the buffer 62 is issued (this instruction is issued by a user), the camera-imaged image processing portion 61 records, in the memory card 9, the imaged-image data stored in the buffer 62.

The image display control portion 10 generates image signals based on imaged-image data output from the camera-imaged image processing portion 61, and outputs the generated image signals to the liquid crystal portion 11 to display a preview image. The image display control portion 10 also generates an image signal based on imaged-image data read from the buffer 62 at image-capturing and outputs the generated image signal to the liquid crystal portion 11 to display a captured image. In a case of reading from the memory card 9 the imaged-image data recorded in the memory card 9, the image display control portion 10 generates an image signal based on the imaged-image data and outputs the generated image signal to the liquid crystal portion 11 to display a recorded image. Incidentally, a nonvolatile memory, such as a flash memory, is used as the memory card 9. Apparently, the memory card 9 is detachably attached to the body of the apparatus. A volatile memory, such as a dynamic random access memory (DRAM), is used as the ring buffer 62.

Thus, when the distance between the touch panel portion 2 and the finger is equal to or less than the first distance and more than the second distance less than the first distance, the camera-imaged image processing portion 61 performs auto-focus (i.e., focus on a predetermined area). Then, when the distance between the touch panel portion 2 and the finger becomes equal to or less than the second distance and equal to or more than 0, image-capturing is performed. Thus a captured image is displayed. Accordingly, image-capturing can be achieved at the best timing (in other words, image-capturing can be performed without missing an image-capturing opportunity.)

Sections (a) and (b) of FIG. 11 are diagrams each illustrating a manner of capturing an image by a smartphone 70 equipped with the imaging device 60 according to the present embodiment. Section (a) illustrates a case where the finger 20 is present in midair of a shutter-icon 71. Section (b) illustrates a case where the finger 20 touches the shutter-icon 71. When the distance Zb between the touch panel portion 2 and the finger 20 is equal to or less than the first distance and exceeds the second distance, auto-focus is performed. Then, when the finger 20 touches the touch panel portion 2 (i.e., the distance Zb between the touch panel portion 2 and the finger 20 becomes equal to or less than the second distance and equal to or more than 0), image-capturing is performed. Incidentally, in this example, focus-adjustment is performed on the object 40 at the center of the screen of the liquid crystal portion 11.

Next, an operation of the imaging device 60 according to the present embodiment is described hereinafter.

FIG. 12 is a flowchart illustrating processing from start of a camera function of the imaging device 60 according to the present embodiment to storage of a captured image. In FIG. 12, the camera-imaged image processing portion 61 starts the camera function in step S20. When starting the camera function, in step S21, the camera-imaged image processing portion 61 determines whether a user's finger 20 is present in midair of the shutter-icon 71 and whether the distance between the touch panel portion 2 and the finger 20 is Zb. When the conditions are not satisfied in the determination, the determination is repeated until the conditions are satisfied. When the conditions are satisfied, in step S22, the camera-imaged image processing portion 61 performs focus-adjustment on the camera 6 and starts auto-focus on the camera 6.

After starting auto-focus, in step S23, the camera-imaged image processing portion 61 determines whether the finger 20 touches the shutter-icon 71. When the shutter-icon 31 is not touched, the present determination is repeated until the condition is satisfied. When touched, in step S24, capturing the images is performed. Then, the captured image is stored in the buffer 62, and the stored captured image is displayed in the liquid crystal portion 11. When a user's instruction for storing the captured image is issued after the captured image is stored in the buffer 62 and displayed in the liquid crystal portion 11, in step S25, the captured image is stored in the memory card 9. Then, the present processing is finished.

Thus, when the distance between the touch panel portion 2 and the finger 20 is equal to or less than the first distance, and more than the second distance being less than the first distance, the imaging device 60 according to the third embodiment performs auto-focus onto a predetermined area in the liquid crystal portion 11. Then, when the distance between the touch panel portion 2 and the finger 20 is equal to or less than the second distance and equal to or more than 0, image-capturing is performed, and a captured image is displayed. Accordingly, image-capturing can be performed at the best timing (i.e., image-capturing can be performed without missing an image-capturing opportunity).

Although a program describing processing illustrated in the flowchart of FIG. 12 is stored in ROM in the imaging device 60 according to the third embodiment, the imaging device 60 may be configured such that the program can be distributed by being stored into a storage medium such as a magnetic disk, an optical disc, a magneto-optical disc, and a flash memory or that the program can be downloaded utilizing an electric telecommunication line by being stored in a server (not shown) on a network such as the Internet.

Fourth Embodiment

Although the above imaging device 60 according to the third embodiment performs auto-focus onto the predetermined area in the liquid crystal portion 11, an imaging device according to a fourth embodiment is capable of performing auto-focus onto an area of a preview image, which corresponds to an indicator. Incidentally, the imaging device according to the fourth embodiment of the invention and the imaging device 60 according to the third embodiment of the invention have common components. Thus, FIG. 10 is invoked. The imaging device according to the fourth embodiment is designated with reference numeral 60A. Incidentally, because a camera-imaged image processing portion according to the fourth embodiment slightly differs in function from the camera-imaged image processing portion 61 of the imaging device 60 according to the third embodiment. Thus, the camera-imaged image processing portion according to the fourth embodiment is designated with reference numeral 61A.

When a finger serving as an indicator enters a range in which the distance to the finger from the touch panel portion 2 is larger than the second distance and equal to or less than the first distance, the camera-imaged image processing portion 61A of the imaging device 60A according to the present embodiment performs auto-focus onto an area of a preview image, which corresponds to the finger, in a preview image. Then, when the finger enters a range in which the distance from the surface of the touch panel portion 2 is equal to or less than the second distance, image-capturing is performed.

Sections (a) and (b) of FIG. 13 are diagrams each illustrating a manner of capturing an image by the smartphone 70 equipped with the imaging device 60A according to the fourth embodiment of the invention. Section (a) illustrates a case where the finger 20 is present in midair of an associated area of a preview image (e.g., a head portion of the object 40 in a preview image). Section (b) illustrates a case where the finger 20 touches the associated area of the preview image. When the finger 20 enters a range where the distance Zc between the touch panel portion 2 and the finger 20 is equal to or less than the first distance and exceeds the second distance, a rectangular focus mark 50 is thus displayed on an area of the preview image, which corresponds to the finger 20. Then, auto-focus is performed. After that, when the finger 20 touches the touch panel portion 2 (i.e., when the distance Zc between the touch panel portion 2 and the finger 20 becomes equal to or less than the second distance and equal to or more than 0), image-capturing is performed. Incidentally, even the imaging device 60A according to the present embodiment can perform image-capturing by operating the shutter-icon 71, similarly to the above imaging device 60 according to the third embodiment.

FIG. 14 is a flowchart illustrating processing from start of a camera function of the imaging device 60A according to the fourth embodiment of the invention to storage of a captured image. In FIG. 14, the camera-imaged image processing portion 61A starts the camera function in step S30. When starting the camera function, in step S31, the camera-imaged image processing portion 61A determines whether a user's finger 20 is present in midair of the preview image and whether the distance between the touch panel portion 2 and the finger 20 is Zc. When the conditions are not satisfied in the determination, the determination is repeated until the conditions are satisfied. When the conditions are satisfied, in step S32, the camera-imaged image processing portion 61A starts autofocus on the camera 6.

After starting auto-focus, in step S33, the camera-imaged image processing portion 61A determines whether the finger 20 touches the preview image. When the preview image is not touched, the present determination is repeated until the condition is satisfied. When touched, in step S34, image-capturing is performed, and a captured image is stored in the buffer 62 and displayed on the liquid crystal portion 11. After the captured image is stored in the buffer 62 and displayed on the liquid crystal portion 11, when an instruction for storing the captured image is issued by a user in step S35, the captured image is stored in the memory card 9. Then, the present processing is finished.

Thus, when the distance between the touch panel portion 2 and the finger 20 is equal to or less than the first distance, and more than the second distance being less than the first distance, the imaging device 60A according to the fourth embodiment performs auto-focus (what is called manual tracking of an object) onto a predetermined area corresponding to the finger in the preview image. Then, when the distance between the touch panel portion 2 and the finger 20 is equal to or less than the second distance and equal to or more than 0, image-capturing is performed, and a captured image is displayed. Accordingly, image-capturing can be performed at the best timing (i.e., image-capturing can be performed without missing an image-capturing opportunity). Especially, in a case where an object frequently moves, the invention is effective.

Although a program describing processing illustrated in the flowchart of FIG. 14 is stored in ROM in the imaging device 60A according to the fourth embodiment, the imaging device 60A may be configured such that the program can be distributed by being stored into a storage medium such as a magnetic disk, an optical disc, a magneto-optical disc, and a flash memory or that the program can be downloaded utilizing an electric telecommunication line by being stored in a server (not shown) on a network such as the Internet.

Fifth Embodiment

FIG. 15 is a block diagram illustrating a schematic configuration of an imaging device according to a fifth embodiment of the invention. The imaging device 80 according to the present embodiment of the invention is mounted in a portable wireless device called a smartphone. A communicative part of the imaging device, which functions as a wireless device, is omitted. Incidentally, the imaging device 80 according to the fifth embodiment and that 60 according to the third embodiment fundamentally employ a common configuration. However, the camera-imaged image processing portion and the image display control portion of the imaging device 80 according to the fifth embodiment slightly differ in function from the camera-imaged image processing portion 61 and the image display control portion 10 of the imaging device 60 according to the third embodiment, respectively. Thus, the camera-imaged image processing portion of the imaging device 80 is designated with reference numeral 81. The image display control portion 10 of the imaging device 80 is designated with reference numeral 10A.

The camera-imaged image processing portion 81 of the imaging device 80 according to the fifth embodiment includes a timer 811 and determines using the timer 811 whether a state, in which the distance between the touch panel portion 2 and a finger serving as an indicator is equal to or less than the first distance and more than the second distance being less than the first distance, is continued for a predetermined time. When this state is continued for the predetermined time, image-capturing is performed, and a captured image is displayed in the liquid crystal portion 11. According to this function, image-capturing can be performed only by keeping the finger placed in a range in which the distance from the touch panel portion 2 is larger than the second distance and equal to and smaller than the first distance, for the predetermined time. Thus, operability is enhanced. In this case, while the finger is placed in the range, at least auto-focus is performed. Although the captured image is stored once in the buffer 62, the captured image is stored in the memory card 9 by a user's operation.

During image-capturing, the camera-imaged image processing portion 81 controls the image display control portion 10A to make the liquid crystal portion 11 indicate that image-capturing-timing is approaching. The indication is schematically performed, for example, in the following manner. Sections (a) to (d) of FIG. 16 are diagrams illustrating an example of schematically indicating that image-capturing timing is approaching. In FIG. 16, an icon 100 including two arrows 101 and 102 opposed to each other is displayed at a lower part of an image. The two arrows 101 and 102 are approaching each other as time passes. The two arrows 101 and 102 of the icon 100 change, as illustrated in Sections (a) to (c) in this order. Section (c) illustrates an indication in a case that a predetermined time has come. When this indication is displayed, image-capturing is performed (i.e., the shutter is released). Section (d) illustrates a captured image. Thus, it is schematically indicated that image-capturing timing is approaching. Consequently, users can know image-capturing timing. Accordingly, users can perform image-capturing at the best timing (in other words, image-capturing can be achieved without missing an image-capturing opportunity). Incidentally, vocal guidance may be performed, instead of the schematic indication. Alternatively, the schematic indication and the vocal guidance may be combined with each other. It may be cited as an example of the vocal guidance that the shutter will be released soon.

FIG. 17 is a flowchart illustrating processing from reset of a timer of the imaging device 80 according to the present embodiment to storage of a captured image. In FIG. 17, the camera-imaged image processing portion 81 resets a timer 811 thereof in step S40. Next, in step S41, the camera-imaged image processing portion 81 determines whether the distance between the touch panel portion 2 and the finger 20 serving as the indicator is equal to or less than the first distance Z1 and more than the second distance Z0 less than the first distance value. When the following condition doesn't hold: Z1≥the distance>Z0, the camera-imaged image processing portion 81 returns to step S40. When the condition holds: Z1≥the distance>Z0, in step S42, the camera-imaged image processing portion 81 starts the timer 811.

After starting the timer 811 when the condition holds: Z1≥the distance>Z0, the camera-imaged image processing portion 81 makes determination concerning the conditions that are the same as those in step S41, again. That is, in step S43, the camera-imaged image processing portion 81 determines whether the distance between the touch panel portion 2 and the finger 20 is equal to or less than the first distance Z1 and whether the distance therebetween is larger than the second distance Z0 which is smaller than the first distance Z1. When the following condition doesn't hold: Z1≥the distance>Z0, the camera-imaged image processing portion 81 returns to step S40. When the condition holds: Z1≥the distance>Z0, in step S44, the camera-imaged image processing portion 81 determines, based on the count-value of the timer 811, whether a predetermined time has elapsed. When the predetermined time hasn't elapsed, the camera-imaged image processing portion 81 returns to step S43. When the predetermined time has elapsed, in step S45, image-capturing is performed. Next, in step S46, a captured image is stored in the buffer 62, and the stored image is displayed in the liquid crystal portion 11. After the captured image is stored in the buffer 62 and displayed in the liquid crystal portion 11, when a user's instruction to store the captured image is issued, in step S47, the captured image is stored in the memory card 9. Then, the present processing is finished.

Thus, when a state, in which the distance between the touch panel portion 2 and the finger 20 serving as the indicator is equal to and less than the first distance and more than the second distance being less than the first distance, is continued for a predetermined time, the imaging device 80 according to the fifth embodiment performs image-capturing. Consequently, operability can be improved. Image-capturing can be performed at the best timing (i.e., image-capturing can be achieved without missing an image-capturing opportunity).

Although a program describing processing illustrated in the flowchart of FIG. 17 is stored in ROM in the imaging device 80 according to the fifth embodiment, the imaging device 80 may be configured such that the program can be distributed by being stored into a storage medium such as a magnetic disk, an optical disc, a magneto-optical disc, and a flash memory or that the program can be downloaded utilizing an electric telecommunication line by being stored in a server (not shown) on a network such as the Internet.

The invention has been described in detail with reference to specific embodiments. However, it is apparent to those skilled in the art that various modifications and alterations can be made without departing from the spirit and the scope of the invention.

Incidentally, the present application is based on Japanese Patent Application (Japanese Patent Application No. 2012-18921) filed on May 24, 2012 and Japanese Patent Application (Japanese Patent Application No. 2012-149601) filed on Jul. 3, 2012 the contents of which are incorporated herein by reference.

INDUSTRIAL APPLICABILITY

The invention has an advantage that a camera-shake-free image can be captured. The invention can be applied to a portable information terminal, such as a smartphone, equipped with an electrostatic-capacitance touch panel.

DESCRIPTION OF REFERENCE NUMERALS AND SIGNS 1, 1A, 60, 60A, 80 imaging devices
2 touch panel portion
3 touch panel controller
4 power-supply-and-control portion
5 coordinate output portion
6 camera
7, 7A, 61, 61A, 81 camera-imaged image processing portions
8 ring buffer
9 memory card
10, 10A image display control portion
11 liquid crystal portion
15 touch panel module
20 finger
30, 70 smartphones
31, 71 shutter-icons
40 object
50 focus mark
62 buffer
811 timer

The invention claimed is:
1. An imaging device comprising:
a camera configured to capture an image;
a display portion configured to display the captured image; and
a touch panel arranged to overlap with the display portion and capable of detecting a distance between the touch panel and an indicator, wherein
the camera is configured to, when the detected distance indicates that the indicator is within a predetermined distance from the touch panel and not touching the touch panel, capture the image by performing a predetermined processing on an area corresponding to a position of the indicator on the display portion, the predetermined pro- cessing including at least one of an auto focus, auto exposure and auto white balancing, and when the indicator touches the area on the display portion having received the predetermined processing, the image captured by performing the predetermined processing on the area is recorded into a non-volatile memory mounted to the imaging device.

2. The imaging device according to claim 1, further comprising:

a buffer configured to store, at a predetermined intervals, the image captured by performing the predetermined processing on the area, wherein the image to be recorded in the non-volatile memory is selected from among the images stored in the buffer before the detected distance indicates that the indicator touches the display portion.

3. The imaging device according to claim 1, wherein the indicator is a finger or a pen.

4. The imaging device according to claim 1, wherein the display portion is configured to, when the distance between the indicator and the display portion is within a predetermined distance and the indicator is not touching the display portion, display an image captured by the camera.

5. The imaging device according to claim 1, wherein the display portion is further configured to display a predetermined icon.

6. The imaging device according to claim 2, wherein the buffer is configured to stop storing the images at the predetermined time intervals when the detected distance indicates that the indicator touches the touch panel.

7. The imaging device according to claim 2, wherein the display portion is further configured to, display the image currently captured before the detected distance indicates that the indicator touches the display portion, and display the selected image when the detected distance indicates that the indicator touches the display portion.

8. The imaging device according to claim 1, wherein the display portion is further configured to display a mark which indicates the area subject to the predetermined processing and moves according to the positon of the indicator.

9. An imaging method for an imaging device that includes a camera capable of capturing an image, a display portion capable of displaying the captured image, and a touch panel arranged to overlap with the display portion and capable of detecting a distance between the touch panel and an indicator, the imaging method comprising:

capturing, by the camera, when the detected distance indicates that the indicator is within a predetermined distance from the touch panel and not touching the touch panel, the image by performing a predetermined processing on an area corresponding to a position of the indicator on the display portion, the predetermined processing including at least one of an auto focus, auto exposure and auto white balancing; and recording, when the indicator touches the area on the display portion having received the predetermined processing, the image captured by performing the predetermined processing on the area into a non-volatile memory mounted to the imaging device.

10. An imaging device, comprising:

a camera configured to capture an image;

a display portion configured to display the captured image; and a touch panel arranged to overlap with the display portion and capable of detecting a distance between the touch panel and an indicator, wherein when the detected distance indicates that, for a time less than a predetermined time, the position of the indicator has been kept within a predetermined distance from the touch panel and not touching the touch panel, the camera captures the image by performing a predetermined processing on an area corresponding to a position of the indicator on the display portion, the predetermined processing including at least one of an auto focus, auto exposure and auto white balancing, when the indicator touches the area on the display portion having received the predetermined processing before the predetermined time has elapsed, the image captured by performing the predetermined processing on the area is recorded into a non-volatile memory mounted to the imaging device, and when the detected distance indicates that, for the predetermined time, the position of the indicator has been kept within the predetermined distance from the touch panel and not touching the touch panel, the captured image is recorded into the non-volatile memory mounted to the imaging device at a timing when the predetermined time has elapsed.

11. The imaging device according to claim 10, wherein the non-volatile memory is detachably mounted.

12. The imaging device according to claim 10, wherein, the display portion is further configured to, while the predetermined time, indicate that a timing of recording the captured image into the non-volatile memory is approaching.

13. The imaging device according to claim 12, wherein the display portion is configured to schematically indicate that the timing of recording the captured image into the non-volatile memory is approaching.

14. An imaging method for an imaging device which includes a camera capable of capturing an image, a display portion capable of displaying the captured image, and a touch panel arranged to overlap with the display portion and capable of detecting a distance between the touch panel and an indicator, the imaging method comprising:

when the detected distance indicates that, for a time less than a predetermined time, the position of the indicator has been kept within a predetermined distance from the touch panel and not touching the touch panel, capturing the image by performing a predetermined processing on an area corresponding to a position of the indicator on the display portion, the predetermined processing including at least one of an auto focus, auto exposure and auto white balancing, when the indicator touches the area on the display portion having received the predetermined processing before the predetermined time has elapsed, the image captured by performing the predetermined processing on the area is recorded into a non-volatile memory mounted to the imaging device, and when the detected distance indicates that, for the predetermined time, the position of the indicator has been kept within the predetermined distance from the touch panel and not touching the touch panel, the captured image is recorded into the non-volatile memory mounted to the imaging device at a timing when the predetermined time has elapsed.

* * * * *